US009771150B2

United States Patent
Smith et al.

(10) Patent No.: US 9,771,150 B2
(45) Date of Patent: Sep. 26, 2017

(54) PIEZOELECTRIC LIQUID INERTIA VIBRATION ELIMINATOR

(71) Applicant: BELL HELICOPTER TEXTRON INC., Fort Worth, TX (US)

(72) Inventors: Michael R. Smith, Colleyville, TX (US); Frank B. Stamps, Colleyville, TX (US); Taeoh Lee, Keller, TX (US); David E. Heverly, Jr., Arlington, TX (US); Robert J. Pascal, Soutlake, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 23 days.

(21) Appl. No.: 13/956,490

(22) Filed: Aug. 1, 2013

(65) Prior Publication Data

US 2013/0306420 A1 Nov. 21, 2013

Related U.S. Application Data

(60) Division of application No. 10/528,920, filed as application No. PCT/US03/30324 on Sep. 24, 2003, (Continued)

(51) Int. Cl.
*F16F 7/10* (2006.01)
*B64C 27/00* (2006.01)
(Continued)

(52) U.S. Cl.
CPC .......... *B64C 27/001* (2013.01); *F16F 7/1005* (2013.01); *F16F 7/108* (2013.01);
(Continued)

(58) Field of Classification Search
CPC .... F16F 7/10; F16F 7/1011; F16F 7/00; F16F 9/00; F16F 9/103; F16F 9/14; F16F 9/50;
(Continued)

(56) References Cited

U.S. PATENT DOCUMENTS 2,964,272 A 7/1955 Olson
3,088,062 A 4/1963 Hudimac
(Continued)

FOREIGN PATENT DOCUMENTS

DE 4407962 C1 6/1995
DE 19812387 C1 * 8/1999
(Continued)

OTHER PUBLICATIONS

Chinese Office Action from the Chinese Patent Office in related Chinese Application No. 2012101503691, mailed Dec. 4, 2013, 4 pages.
(Continued)

Primary Examiner — Melody Burch
(74) Attorney, Agent, or Firm — James E. Walton

(57) ABSTRACT

A tunable vibration isolator with active tuning elements having a housing, fluid chamber, and at least one tuning port. A piston is resiliently disposed within the housing. A vibration isolation fluid is disposed within the fluid chambers and the tuning ports. The tunable vibration isolator may employ either a solid tuning mass approach or a liquid tuning mass approach. The active vibration elements are preferably solid-state actuators.

12 Claims, 25 Drawing Sheets

Related U.S. Application Data now Pat. No. 8,499,907, which is a continuation-in-part of application No. 09/965,114, filed on Sep. 26, 2001, now Pat. No. 6,695,106.

(60) Provisional application No. 60/413,515, filed on Sep. 24, 2002, provisional application No. 60/441,907, filed on Jan. 22, 2003, provisional application No. 60/235,656, filed on Sep. 26, 2000.

(51) Int. Cl.

| | |
|---|---|
| *F16F 7/108* | (2006.01) |
| *F16F 13/08* | (2006.01) |
| *F16F 13/24* | (2006.01) |
| *F16F 13/26* | (2006.01) |
| *F16F 15/00* | (2006.01) |
| *F16F 15/027* | (2006.01) |
| *F16F 9/00* | (2006.01) |

(52) U.S. Cl.
CPC ............ *F16F 7/1034* (2013.01); *F16F 13/08* (2013.01); *F16F 13/24* (2013.01); *F16F 13/26* (2013.01); *F16F 15/005* (2013.01); *F16F 15/027* (2013.01); *B64C 2027/005* (2013.01)

(58) Field of Classification Search
CPC .......... F16F 13/00; F16F 15/00; F16F 15/005; F16F 15/02; F16F 7/1005; F16F 7/1034; F16F 7/108; F16F 13/08; F16F 13/24; F16F 13/26; F16F 15/027; B64C 27/001; B64C 2027/005
USPC .......... 188/378, 379, 380, 316, 317, 322.22; 267/136, 140.11, 140.14, 140.15; 248/562, 636; 244/54, 17.21, 17.23, 244/17.27

See application file for complete search history.

(56) References Cited

U.S. PATENT DOCUMENTS

| | | | |
|---|---|---|---|
| 4,236,607 A | 12/1980 | Halwes et al. | |
| 4,600,863 A | 7/1986 | Chaplin et al. | |
| 4,725,019 A | 2/1988 | White | |
| 4,869,474 A | 9/1989 | Best et al. | |
| 5,022,628 A | 6/1991 | Johnson et al. | |
| 5,130,948 A | 7/1992 | Laukien et al. | |
| 5,174,552 A | 12/1992 | Hodgson et al. | |
| 5,265,552 A | 11/1993 | Taylor | |
| 5,316,240 A | 5/1994 | Girard et al. | |
| 5,435,531 A | 7/1995 | Smith et al. | |
| 5,439,082 A | 8/1995 | McKeown et al. | |
| 5,458,222 A | 10/1995 | Pla et al. | |
| 5,568,847 A | 10/1996 | Guilloud et al. | |
| 5,732,905 A | 3/1998 | Krysinski | |
| 5,788,029 A * | 8/1998 | Smith et al. | 188/267 |
| 5,788,372 A * | 8/1998 | Jones et al. | 267/136 |
| 5,906,254 A | 5/1999 | Schmidt et al. | |
| 5,927,699 A | 7/1999 | Nakajima et al. | |
| 5,947,457 A * | 9/1999 | Swanson et al. | 267/140.14 |
| 5,957,440 A | 9/1999 | Jones et al. | |
| 6,009,983 A | 1/2000 | Stamps et al. | |
| 6,059,274 A * | 5/2000 | Owen et al. | 267/136 |
| 6,116,179 A | 9/2000 | Swinbanks et al. | |
| 6,129,306 A | 10/2000 | Pham | |
| 6,241,223 B1 * | 6/2001 | Gugsch et al. | 267/140.13 |
| 6,293,532 B2 | 9/2001 | McGuire | |
| 7,013,832 B2 | 3/2006 | Sexton et al. | |
| 2002/0060268 A1 | 5/2002 | Smith et al. | |
| 2012/0040853 A1 | 2/2012 | Pierik et al. | |

FOREIGN PATENT DOCUMENTS

| | | |
|---|---|---|
| FR | 2689951 A1 | 10/1993 |
| FR | 2703121 | 9/1994 |
| JP | 61171686 | 2/1986 |
| WO | 88/05506 A | 7/1988 |
| WO | 89/05930 A1 | 6/1989 |
| WO | 91/15687 A1 | 10/1991 |
| WO | 02/27210 A1 | 4/2002 |
| WO | 03/104675 A | 12/2003 |

OTHER PUBLICATIONS

European Office Action from the European Patent Office in related European Application No. 09169365.5, mailed Nov. 10, 2013, 4 pages.
European Office Action from the European Patent Office in related European Application No. 09169354.9, mailed Nov. 10, 2013, 4 pages.
European Office Action from the European Patent Office in related European Application No. 09169360.6, mailed Nov. 10, 2013, 5 pages.
Chinese First Office Action in Chinese counterpart Application No. 200910225341.8, issued by State Intellectual Property Office of the People's Republic of China, Sep. 1, 2011.
Office Action in Canadian counterpart Application No. 2,497,417, issued by Canadian Intellectual Property Office, Jan. 15, 2010.
European Search Report in European counterpart Application No. 09169320, issued by European Patent Office, Dec. 23, 2010, 4 pages.
European Search Report in European counterpart Application No. 09169354, issued by European Patent Office, Dec. 23, 2010, 8 pages.
European Search Report in European counterpart Application No. 09169360, issued by European Patent Office, Dec. 30, 2010, 9 pages.
European Search Report in European counterpart Application No. 09169365, issued by European Patent Office, Dec. 23, 2010, 8 pages.
Office Action in Canadian counterpart Application No. 2,497,417, issued by Canadian Intellectual Property Office, Dec. 16, 2010.
European Search Report in European counterpart Application No. 09169361.4, issued by European Patent Office, Dec. 9, 2010.
Nixon M.W. et al, Tiltrotor Vibration Reduction Through Higher Harmonic Control, Journal of the American Helicopter Society, Jul. 1998, 235-245, vol. 43, No. 3, Alexandria, VA, US.
European Office Action from the European Patent Office in related European Application No. 09169320, mailed Oct. 23, 2012, 5 pages.
European Office Action from the European Patent Office in related European Application No. 09169354, mailed Oct. 23, 2012, 5 pages.
European Office Action from the European Patent Office in related European Application No. 09169360, mailed Oct. 24, 2012, 5 pages.
European Office Action from the European Patent Office in related European Application No. 09169361, mailed Oct. 24, 2012, 4 pages.
European Office Action from the European Patent Office in related European Application No. 09169365, mailed Oct. 23, 2012, 4 pages.
Second Office Action issued by the Chinese Patent Office concerning related Chinese Patent Application No. 200910225341.8, mailed Jun. 20, 2012, 3 pages.
Office Action dated Jul. 10, 2014 from counterpart CN App. No. 2012101503691.
Office Action dated Jan. 26, 2015 from counterpart CN App. No. 201210150369.1.

* cited by examiner

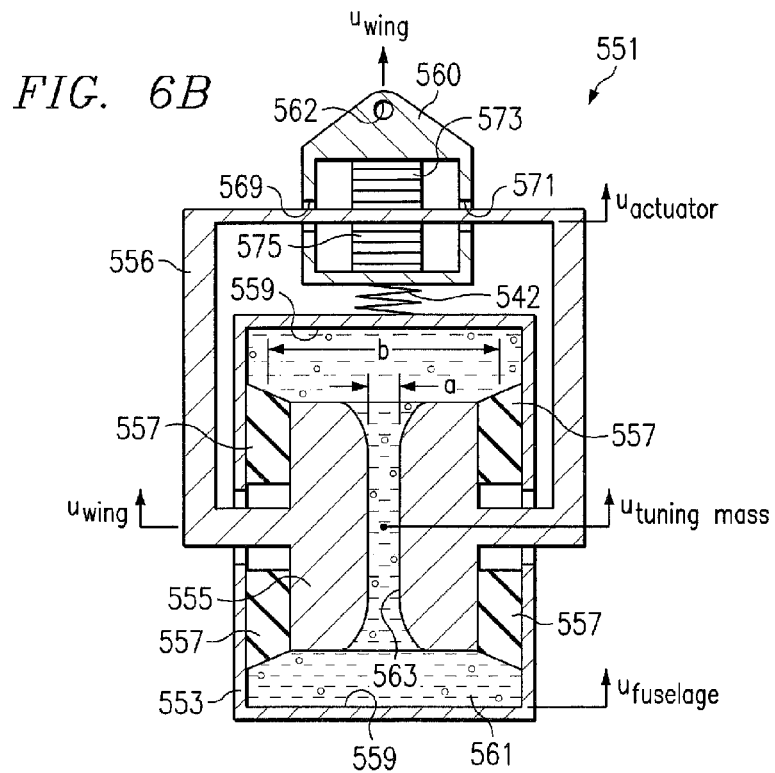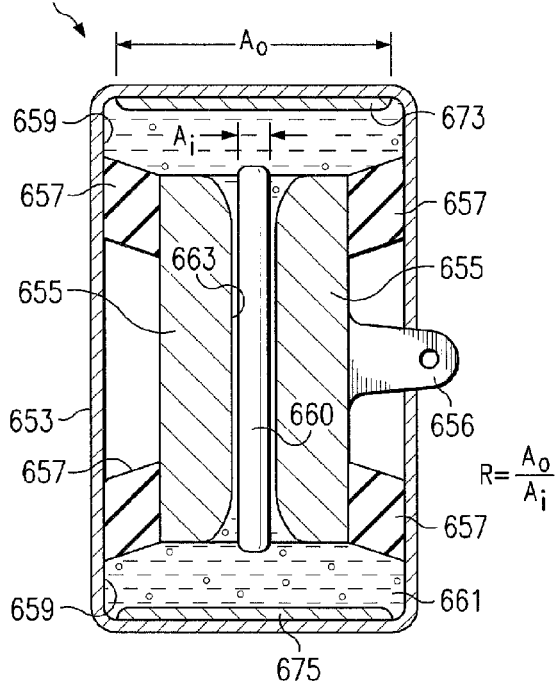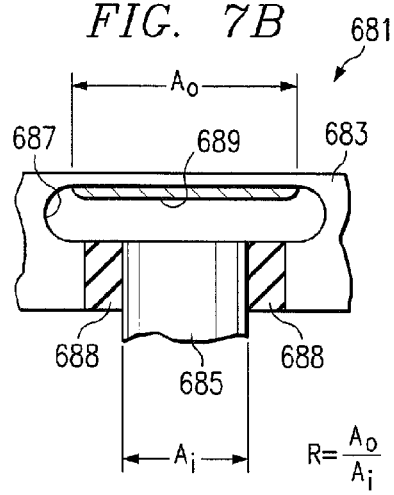

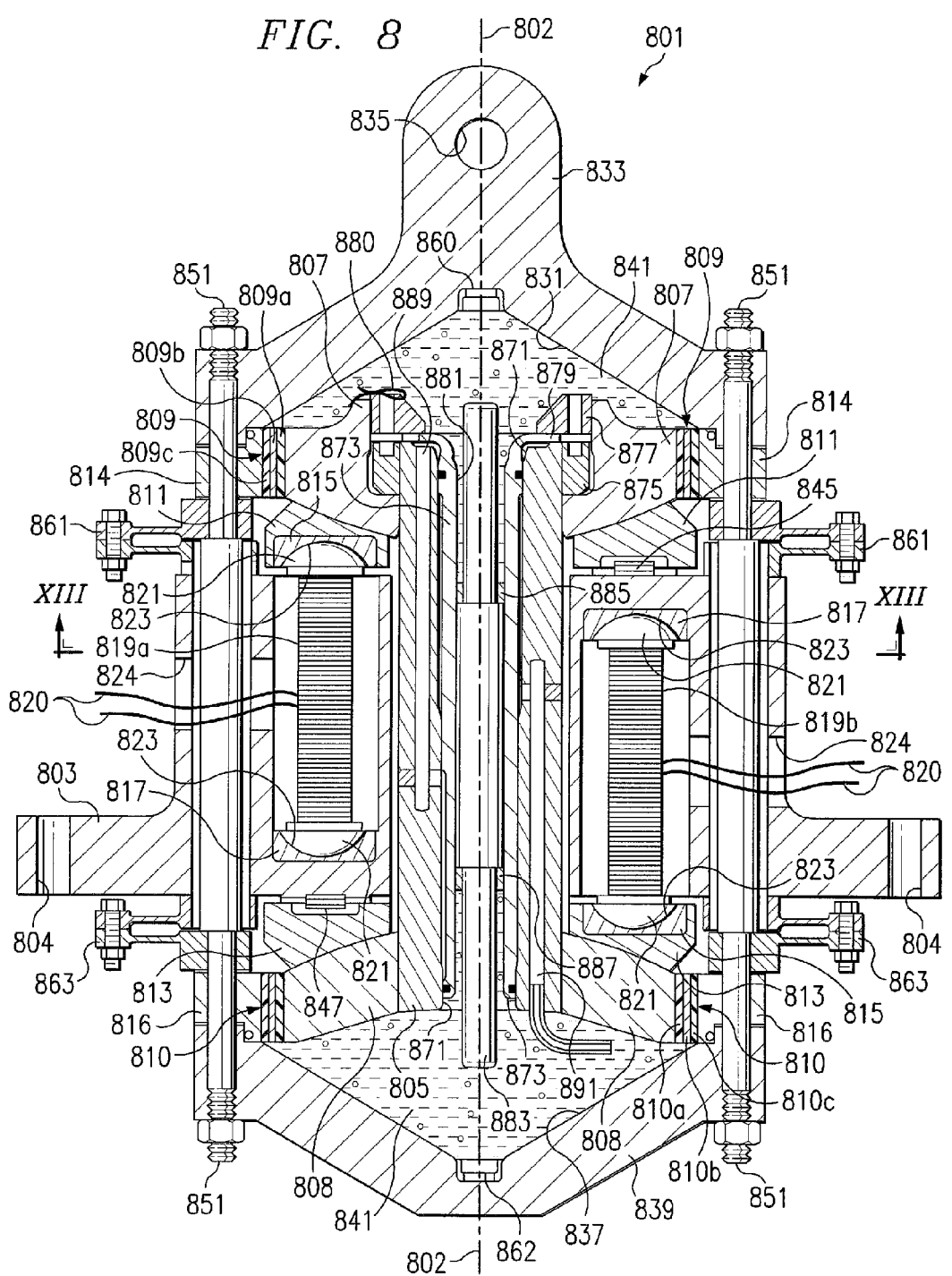

| GOVERNING EQUATION FOR ISOLATION FREQUENCY |
|---|
| $f_{isolation} = \dfrac{1}{2\pi}\sqrt{\dfrac{4K\eta g}{R_{LIVE}(R_{LIVE}-1)\pi d_t^2 l_t \rho_t}}$ |

| AREA RATIOS |
|---|
| $R_{piezo} = \dfrac{(2.1884)^2}{(1.1447)^2} = 3.65$ |

LENGTH AND NUMBER OF TURNS
OF FLUID TUNING PASSAGE $$l_t = \frac{4K\eta g}{R_{LIVE}(R_{LIVE}-1)\pi d_t^2 \rho_t (2\pi f_{isolation})^2}$$

$$N = \frac{l_t}{2\pi r_t}$$

PIEZOELECTRIC LIQUID INERTIA VIBRATION ELIMINATOR

CROSS REFERENCE TO RELATED APPLICATIONS

This application is a divisional application of U.S. application Ser. No. 10/528,920, filed 9 Jan. 2006, titled "Piezoelectric Liquid Inertia Vibration Eliminator," which issued on 6 Aug. 2013 under U.S. Pat. No. 8,499,907, which is a national stage entry of PCT Application No PCT/US03/30324, filed 24 Sep. 2003, titled "Piezoelectric Liquid Inertia Vibration Eliminator," which claims the benefit of U.S. Provisional Application No. 60/441,907, filed 22 Jan. 2003, titled "Piezoelectric Liquid Inertia Vibration Eliminator," and which claims the benefit of U.S. Provisional Application No. 60/413,515, filed 24 Sep. 2002, titled "Piezoelectric Liquid Inertia Vibration Eliminator," and which is a continuation-in-part of U.S. application Ser. No. 09/965,114, filed 26 Sep. 2001, titled "Method and Apparatus for Improved Vibration Isolation," which issued on 24 Feb. 2004 under U.S. Pat. No. 6,695,106, which claims the benefit of U.S. Provisional Application No. 60/235,656, filed 26 Sep. 2000, titled "Method and Apparatus for Improved Vibration Isolation."

BACKGROUND

1. Field of the Invention

The present invention relates in general to active vibration control. More specifically, the present invention relates to methods and apparatuses for isolating mechanical vibrations in structures or bodies that are subject to harmonic or oscillating displacements or forces. The present invention is well suited for use in the field of aircraft, in particular, helicopters and other rotary wing aircraft.

2. Description of Related Art

For many years, effort has been directed toward the design of apparatus for isolating a vibrating body from transmitting its vibrations to another body. Such apparatuses are useful in a variety of technical fields in which it is desirable to isolate the vibration of an oscillating or vibrating device, such as an engine, from the remainder of the structure. Typical vibration isolation and attenuation devices ("isolators") employ various combinations of the mechanical system elements (springs and mass) to adjust the frequency response characteristics of the overall system to achieve acceptable levels of vibration in the structures of interest in the system. One field in which these isolators find a great deal of use is in aircraft, wherein vibration-isolation systems are utilized to isolate the fuselage or other portions of an aircraft from mechanical vibrations, such as harmonic vibrations, which are associated with the propulsion system, and which arise from the engine, transmission, and propellers or rotors of the aircraft.

Vibration isolators are distinguishable from damping devices in the prior art that are erroneously referred to as "isolators." A simple force equation for vibration is set forth as follows:

$$F = m\ddot{x} + c\dot{x} + kx$$

A vibration isolator utilizes inertial forces ($m\ddot{x}$) to cancel elastic forces ($kx$). On the other hand, a damping device is concerned with utilizing dissipative effects ($c\dot{x}$) to remove energy from a vibrating system.

One important engineering objective during the design of an aircraft vibration-isolation system is to minimize the length, weight, and overall size including cross-section of the isolation device. This is a primary objective of all engineering efforts relating to aircraft. It is especially important in the design and manufacture of helicopters and other rotary wing aircraft, such as tilt rotor aircraft, which are required to hover against the dead weight of the craft, and which are, thus, somewhat constrained in their payload in comparison with fixed-wing aircraft.

Another important engineering objective during the design of vibration-isolation systems is the conservation of the engineering resources that have been expended in the design of other aspects of the aircraft or in the vibration-isolation system. In other words, it is an important industry objective to make incremental improvements in the performance of vibration isolation systems which do not require radical re-engineering or complete redesign of all of the components which are present in the existing vibration-isolation systems.

A marked departure in the field of vibration isolation, particularly as applied to aircraft and helicopters is disclosed in commonly assigned U.S. Pat. No. 4,236,607, titled "Vibration Suppression System," issued 2 Dec. 1980, to Halwes, et al. (Halwes '607). Halwes '607 is incorporated herein by reference. Halwes '607 discloses a vibration isolator in which a dense, low-viscosity fluid is used as the "tuning" mass to counterbalance, or cancel, oscillating forces transmitted through the isolator. This isolator employs the principle that the acceleration of an oscillating mass is 1800 out of phase with its displacement.

In Halwes '607, it was recognized that the inertial characteristics of a dense, low-viscosity fluid, combined with a hydraulic advantage resulting from a piston arrangement, could harness the out-of-phase acceleration to generate counter-balancing forces to attenuate or cancel vibration. Halwes '607 provided a much more compact, reliable, and efficient isolator than was provided in the prior art. The original dense, low-viscosity fluid contemplated by Halwes '607 was mercury, which is toxic and highly corrosive.

Since Halwes' early invention, much of the effort in this area has been directed toward replacing mercury as a fluid or to varying the dynamic response of a single isolator to attenuate differing vibration modes. An example of the latter is found in commonly assigned U.S. Pat. No. 5,439,082, titled "Hydraulic Inertial Vibration Isolator," issued 8 Aug. 1995, to McKeown, et al. (McKeown '082). McKeown '082 is incorporated herein by reference.

Several factors affect the performance and characteristics of the Halwes-type isolator, including the density and viscosity of the fluid employed, the relative dimensions of components of the isolator, and the like. One improvement in the design of such isolators is disclosed in commonly assigned U.S. Pat. No. 6,009,983, titled "Method and Apparatus for Improved Isolation," issued 4 Jan. 2000, to Stamps et al. (Stamps '983). In Stamps '983, a compound radius at the each end of the tuning passage was employed to provide a marked improvement in the performance of the isolator. Stamps '983 is incorporated herein by reference.

SUMMARY OF THE INVENTION

Although the foregoing inventions represent great strides in the area of vibration isolation, certain shortcomings remain, in particular, the ability to actively tune the isolator.

Therefore, it is an object of the present invention to provide a vibration isolation system in which the isolator can be actively tuned.

It is another object of the present invention to provide a vibration isolator that allows active tuning of the isolator, as well as, simultaneous vibration treatment of multiple harmonics.

It is yet another object of the present invention to provide a vibration isolator that allows active tuning of the isolator, as well as, active "negative" damping which results in near zero vibration transmissibility.

It is yet another object of the present invention to provide a vibration isolator that allows active tuning of the isolator by utilizing piezoceramic elements for actuation.

These and other objectives are achieved by providing a tunable vibration isolator with active tuning elements having a housing which defines fluid chambers. A piston is disposed within the housing. A vibration isolation fluid is disposed within the fluid chambers. A passage having a predetermined diameter extends through the piston to permit the vibration isolation fluid to flow from one fluid chamber to the other. The tunable vibration isolator may employ either a solid tuning mass approach or a liquid tuning mass approach. In either case, active tuning elements, or actuators, are disposed in the fluid chambers to selectively alter the dynamic characteristics of the vibration isolator.

Preferably, the relatively enlarged portion is defined by a compound radius which extends over a predetermined length of the passage.

Additional objectives, features and advantages will be apparent in the written description which follows.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIG. 6B is a simplified schematic shown in cross section of the tunable vibration isolator of FIG. 6A;

FIG. 7A is a simplified schematic shown in cross section of another alternate embodiment of the tunable vibration isolator according to the present invention;

FIG. 7B is a simplified schematic shown in cross section of another alternate embodiment of the tunable vibration isolator according to the present invention;

FIG. 8 is a cross-sectional view of the preferred embodiment of the tunable vibration isolator according to the present invention;

DETAILED DESCRIPTION OF THE PREFERRED EMBODIMENT

Figure 1:
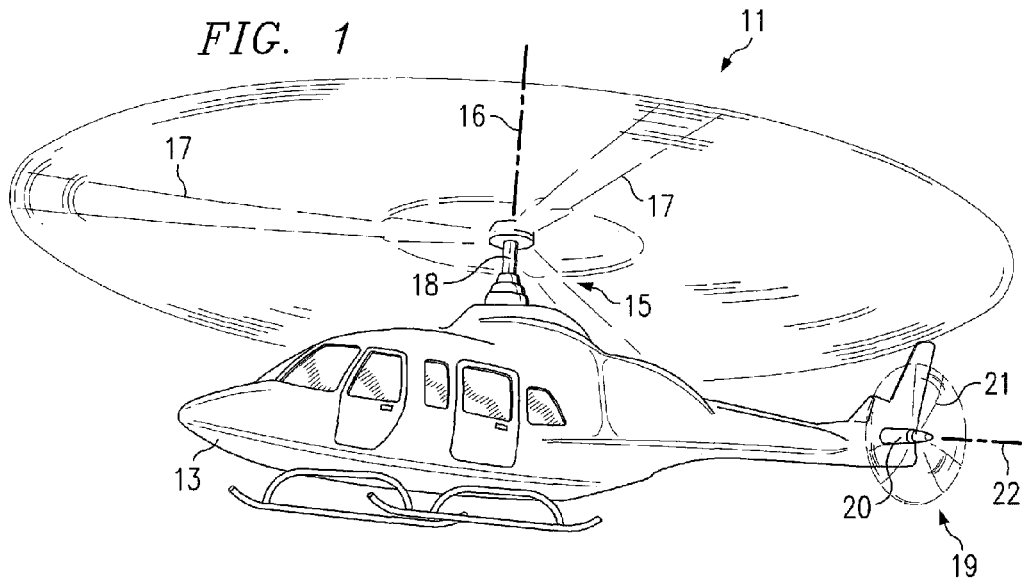
FIG. 1 is a perspective view of a helicopter according to the present invention.

Referring to FIG. 1 in the drawings, a helicopter 11 according to the present invention is illustrated. Helicopter 11 has a fuselage 13 and a main rotor assembly 15, including main rotor blades 17 and a main rotor shaft 18. Helicopter 11 has a tail rotor assembly 19, including tail rotor blades 21 and a tail rotor shaft 20. Main rotor blades 17 generally rotate about a vertical axis 16 of main rotor shaft 18. Tail rotor blades 21 generally rotate about a lateral axis 22 of tail rotor shaft 20. Helicopter 11 also includes a vibration isolation system according to the present invention for isolating fuselage 13 or other portions of helicopter 11 from mechanical vibrations, such as harmonic vibrations, which are associated with the propulsion system and which arise from the engine, transmission, and rotors of helicopter 11.

Figure 2A:
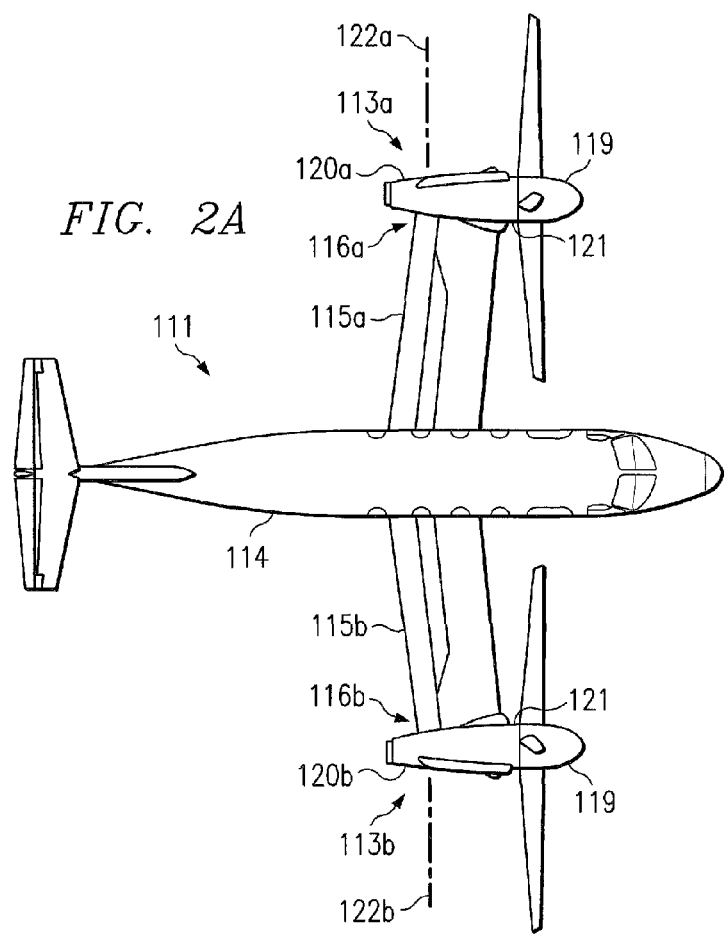
FIG. 2A is a plan view of a tilt rotor aircraft according to the present invention in an airplane mode.
Figure 2B:
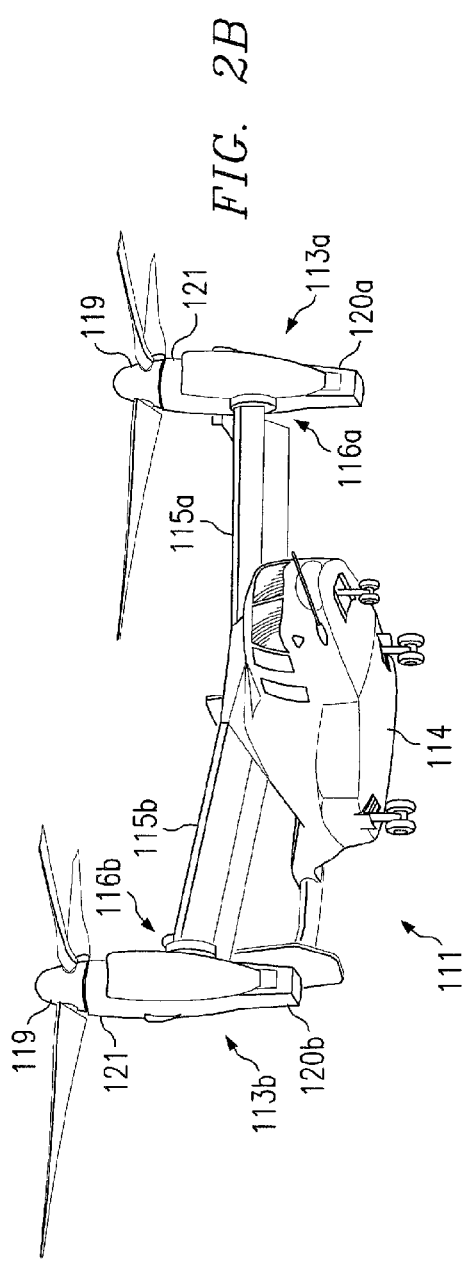
FIG. 2B is a perspective view of a tilt rotor aircraft according to the present invention in a helicopter mode.

The present invention may also be utilized on other types of rotary wing aircraft. Referring now to FIGS. 2A and 2B in the drawings, a tilt rotor aircraft 111 according to the present invention is illustrated. As is conventional with tilt rotor aircraft, rotor assemblies 113a and 113b are carried by wings 115a and 115b, and are disposed at end portions 116a and 116b of wings 115a and 115b, respectively. Tilt rotor assemblies 113a and 113b include nacelles 120a and 120b, which carry the engines and transmissions of tilt rotor aircraft 111, as well as, rotor hubs 119a and 119b on forward ends 121a and 121b of tilt rotor assemblies 113a and 113b, respectively.

Tilt rotor assemblies 113a and 113b move or rotate relative to wing members 115a and 115b between a helicopter mode in which tilt rotor assemblies 113a and 113b are tilted upward, such that tilt rotor aircraft 111 flies like a conventional helicopter; and an airplane mode in which tilt rotor assemblies 113a and 113b are tilted forward, such that tilt rotor aircraft 111 flies like a conventional propeller driven aircraft. In FIG. 2A, tilt rotor aircraft 111 is shown in the airplane mode; and in FIG. 2B, tilt rotor aircraft 111 is shown in the helicopter mode. As shown in FIGS. 2A and 2B, wings 115a and 115b are coupled to a fuselage 114. Tilt rotor aircraft 111 also includes a vibration isolation system according to the present invention for isolating fuselage 114 or other portions of tilt rotor aircraft 111 from mechanical vibrations, such as harmonic vibrations, which are associated with the propulsion system and which arise from the engines, transmissions, and rotors of tilt rotor aircraft 111.

Figure 3:
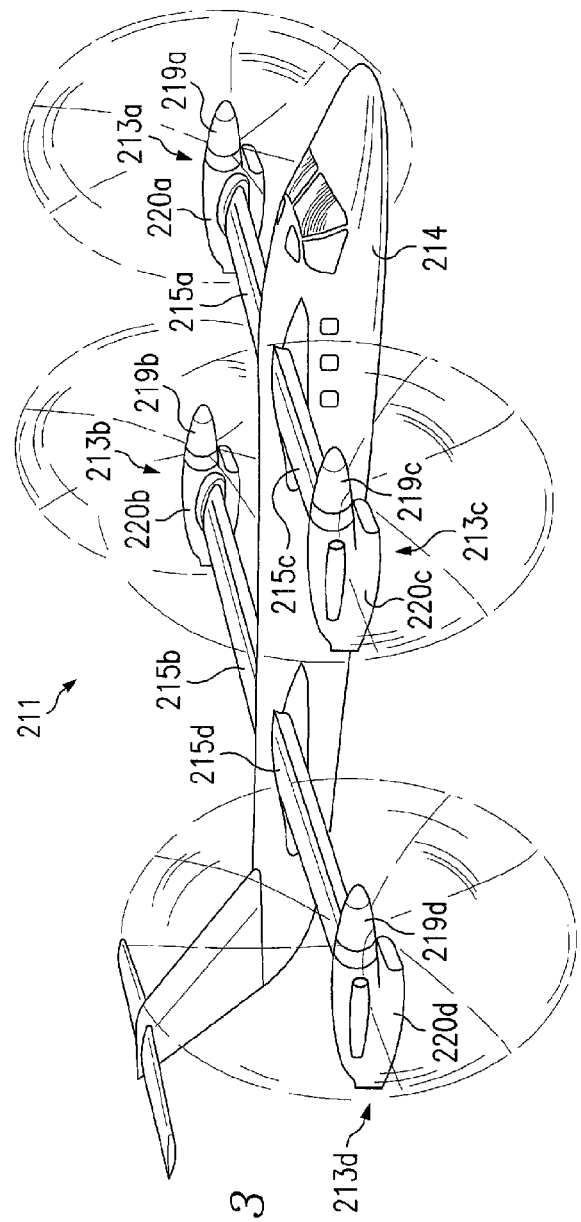
FIG. 3 is a perspective view of a quad tilt rotor aircraft according to the present invention in an airplane mode.

Referring now to FIG. 3 in the drawings, a quad tilt rotor aircraft 211 according to the present invention is illustrated. As with the tilt rotor aircraft of FIGS. 2A and 2B, rotor assemblies 213a, 213b, 213c, and 213d are carried by a forward wing 215a, 215c, and an aft wing 215b, 215d, respectively. Tilt rotor assemblies 213a, 213b, 213c, and 213d include nacelles 220a, 220b, 220c, and 220d, which carry the engines and transmissions of quad tilt rotor aircraft 211, as well as, rotor hubs 219a, 219b, 219c, and 219d on forward ends of tilt rotor assemblies 213a, 213b, 213c, and 213d, respectively.

Tilt rotor assemblies 213a, 213b, 213c, and 213d move or rotate relative to wing members 215a, 215b, 215c, and 215d between a helicopter mode in which tilt rotor assemblies 213a, 213b, 213c, and 213d are tilted upward, such that quad tilt rotor aircraft 211 flies like a conventional helicopter; and an airplane mode in which tilt rotor assemblies 213a, 213b, 213c, and 213d are tilted forward, such that quad tilt rotor aircraft 211 flies like a conventional propeller driven aircraft. In FIG. 3, quad tilt rotor aircraft 111 is shown in the airplane mode. As shown in FIG. 3, wings 215a, 215b, 215c, and 215d are coupled to a fuselage 214. Tilt rotor aircraft 211 also includes a vibration isolation system according to the present invention for isolating fuselage 214 or other portions of quad tilt rotor aircraft 211 from mechanical vibrations, such as harmonic vibrations, which are associated with the propulsion system and which arise from the engines, transmissions, and rotors of quad tilt rotor aircraft 211.

It should be understood that the present invention may be used with any aircraft on which it would be desirable to have vibration isolation according to the present invention, including unmanned aerial vehicles that are remotely piloted.

Figure 4A:
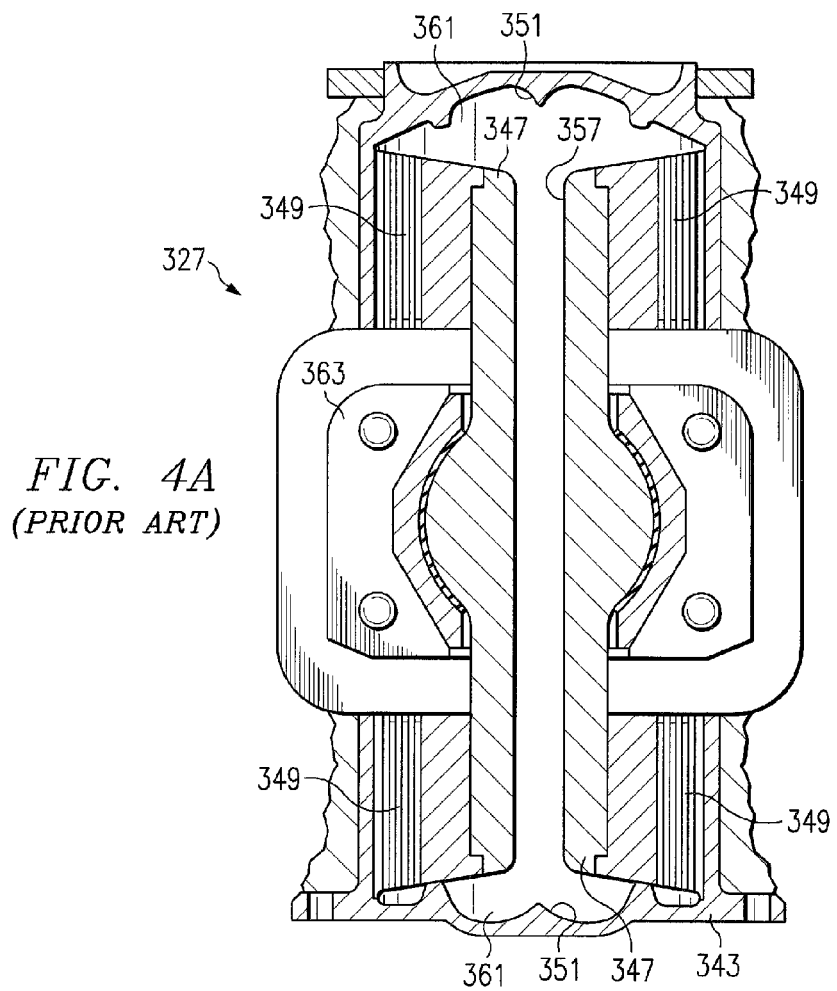
FIG. 4A is a cross-sectional view of a prior art liquid inertia vibration eliminator.

Referring now to FIG. 4A in the drawings, a prior art liquid inertia vibration eliminator (LIVE unit) 327 for use on an aircraft is illustrated. Prior art LIVE unit 327 includes a housing 343 that has a hollow, generally cylindrical interior. A piston 347 of selected cross-sectional diameter is disposed within the interior of housing 343. Housing 343 would typically be coupled to the fuselage of an aircraft (not shown) and piston 347 would typically be coupled to the transmission and propulsion system of the aircraft (not shown) via a pylon assembly at an attachment bracket 363. In such an arrangement, the fuselage serves as the body to be isolated from vibration, and the transmission of the aircraft serves as the vibrating body. An elastomeric seal and spring member 349 resiliently seals piston 347 within the interior of housing 343.

A fluid chamber 361 is defined by the interior of housing 343 and piston 347 and is sealed against leakage by elastomer member 349. A known-density, low-viscosity vibration-isolation fluid, also referred to as tuning fluid, is disposed within fluid chamber 361. In addition to sealing the vibration-isolation fluid in fluid chamber 361, elastomer member 349 functions as a spring to permit piston 347 to move or oscillate relative to housing 343, while maintaining piston 347 in a central location in housing 343 when no load is applied.

A tuning port or passage 357 extends centrally through piston 347 and permits the vibration-isolation fluid to move from one end of fluid chamber 361 to the other. A conical flow diverter 351 is provided at each end of housing 343 and is aligned with and generally opposes the opening at each end of tuning passage 357. Each conical flow diverter 351 enhances fluid flow by decelerating the vibration-isolation fluid as it flows from each end of the fluid chamber into and out of passage 357.

Figure 4B:
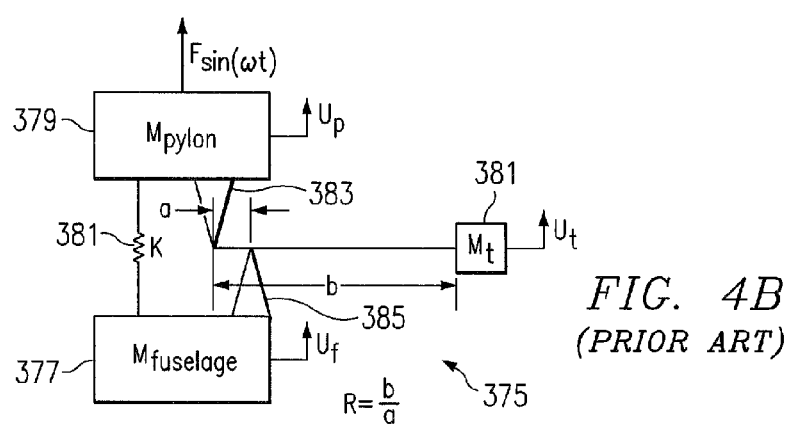
FIG. 4B is a force diagram of the prior art liquid inertia vibration eliminator of FIG. 4A.

Referring now to FIG. 4B in the drawings, a mechanical equivalent model 375 for the prior art LIVE unit 327 of FIG. 4A is illustrated. In mechanical equivalent model 375, a box 377 represents the mass of the fuselage $M_{fuselage}$; a box 379 represents the mass of the pylon assembly $M_{pylon}$; and a box 381 represents the mass of the tuning mass $M_t$, in this case, the vibration-isolation fluid. A vibratory force $F \cdot \sin(\omega t)$ is generated by the engine, transmission, and propulsion system. Force F·sin(ωt) is a function of the frequency of vibration of the transmission and propulsion system.

Force F·sin(ωt) causes an oscillatory displacement up of the pylon assembly; an oscillatory displacement of the fuselage $u_f$; and an oscillatory displacement of the tuning mass $u_t$. Elastomer member 349 is represented by a spring 382 disposed between the fuselage $M_{fuselage}$ and the pylon assembly $M_{pylon}$. Spring 382 has a spring constant K.

In mechanical equivalent model 375, tuning mass $M_t$ functions as if cantilevered from a first fulcrum 383 attached to the pylon assembly $M_{pylon}$, and a second fulcrum 385 attached to the fuselage $M_{fuselage}$. The distance a from first fulcrum 383 to second fulcrum 385 represents the cross-sectional area of tuning port 357, and the distance b from first fulcrum 383 to the tuning mass $M_t$ represents the effective cross-sectional area of piston 347, such that an area ratio, or hydraulic ratio, R is equal to the ratio of b to a. Mechanical equivalent model 375 leads to the following equation of motion for the system:

$$\begin{bmatrix} M_{pylon} + (R-1)^2 M_t & -R(R-1)M_t \\ -R(R-1)M_t & M_{fuselage} + R^2 M_t \end{bmatrix} \begin{Bmatrix} \ddot{u}_p \\ \ddot{u}_f \end{Bmatrix} + \begin{bmatrix} K & -K \\ -K & K \end{bmatrix} \begin{Bmatrix} u_p \\ u_f \end{Bmatrix} = \begin{Bmatrix} F\sin(\omega t) \\ 0 \end{Bmatrix}$$

As is evident, no means for actively tuning LIVE unit 327 is available. Once the cross-sectional areas of tuning passage 357 and piston 347 are determined, and the tuning fluid is chosen, the operation of LIVE unit 327 is set, and cannot be altered without altering one or more of these features. On the other hand, the present invention provides a means of actively tuning the functionality a LIVE unit during operation.

Figure 4C:
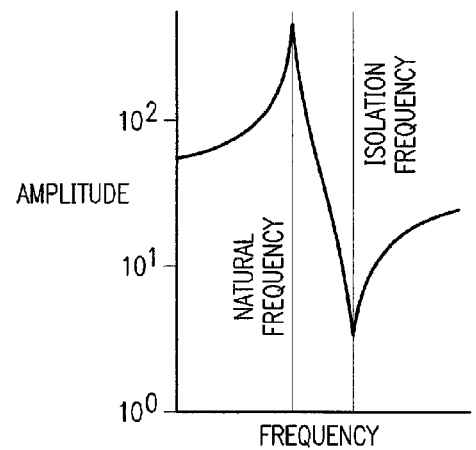
FIG. 4C is a plot of amplitude versus frequency for the prior art liquid inertia vibration eliminator of FIG. 4A.

Referring now to FIG. 4C in the drawings, a plot of amplitude versus frequency for LIVE unit 327 and mechanical equivalent model 375 is illustrated.

Figure 5A:
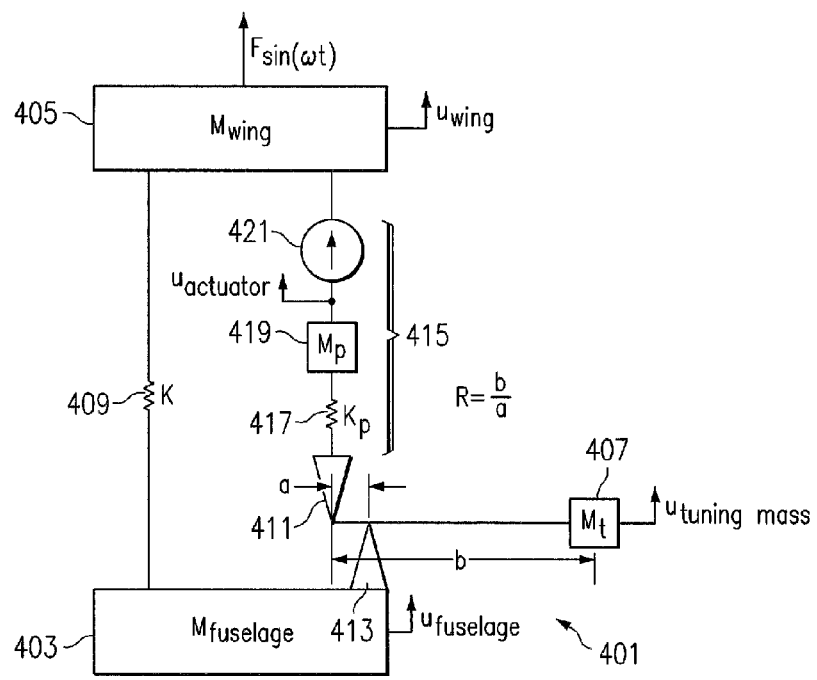
FIG. 5A is a mechanical equivalent model of the preferred embodiment of the tunable vibration isolator according to the present invention.

Referring now to FIG. 5A in the drawings, a mechanical equivalent model 401 for the tunable vibration isolator according to the present invention is illustrated. The tunable vibration isolator of the present invention is preferably used to isolate the vibration generated by the transmission and propulsion system of an aircraft, such as aircraft 11, 111, and 211, from the fuselage, such as fuselages 14, 114, and 214 (see FIGS. 1-3). However, it should be understood that although the tunable vibration isolator of the present invention is described herein with respect to an aircraft application, it may be used in any application in which it is desirable to isolate the vibration between one body and another. The following discussion of the preferred embodiment of the present invention will be with respect to an application of the tunable vibration isolator on quad tilt rotor aircraft 211 (see FIG. 3) to isolate the vibratory forces generated in forward wing 215a, 215c from fuselage 214.

In mechanical equivalent model 401, fuselage 214 is represented as the mass of the fuselage $M_{fuselage}$, or box 403; forward wing 215a, 215c is represented as the mass of the wing $M_{wing}$, or box 405; and a box 407 represents the mass of the tuning mass $M_t$, which in the present invention may be either a rod disposed in a tuning port or merely vibration-isolation fluid disposed in the tuning port, as will be described in detail below. In the preferred embodiment, the tuning mass is a tungsten rod. A vibratory force F·sin(ωt) is generated by the engine, transmission, and propulsion system carried by nacelle 220a at the tip of wing 215a. Force F·sin(ωt) is a function of the frequency of vibration of the wing caused primarily by the transmission and propulsion system.

Force F·sin(ωt) causes an oscillatory displacement $u_{wing}$ of the wing $M_{wing}$; an oscillatory displacement $u_{fuselage}$ of the fuselage $M_{fuselage}$; and an oscillatory displacement $U_{tuning\ mass}$ of the tuning mass $M_t$. As with the prior art LIVE unit 327, a spring member, represented by a spring 409, is disposed between the fuselage $M_{fuselage}$ and the wing $M_{wing}$. Spring 409 has a spring constant K. Spring 409 will be discussed in more detail below.

Tuning mass $M_t$ is operably associated with fuselage $M_{fuselage}$ and wing $M_{wing}$. In mechanical equivalent model 401, tuning mass $M_t$ functions as if cantilevered from a first fulcrum 411 attached to wing member $M_{wing}$, and a second fulcrum 413 attached to the fuselage $M_{fuselage}$. The distance a from first fulcrum 411 to second fulcrum 413 represents the cross-sectional area of the tuning rod or port, and the distance b from first fulcrum 411 to the tuning mass $M_t$ represents the effective cross-sectional area of a piston (see 455 in FIG. 5B), such that an area ratio, or hydraulic ratio, R is equal to the ratio of b to a.

An active tuning element 415 is disposed between the wing member $M_{wing}$ and the tuning mass $M_t$. Active tuning element 415 functions to make fulcrum 411 vibrate. It should be understood that active tuning element 415 may represent a plurality of active tuning elements acting either together or independently. In the preferred embodiment, three pairs of active tuning elements are employed, as will be discussed in more detail below. In the preferred embodiment, active tuning element 415 is a piezoceramic element that oscillates in the range of about 16.6 Hz to 19.9 Hz to counteract the vibration of the wing member $M_{wing}$. It should be understood that active tuning element 415 may be comprised of other smart materials, such as electrostrictive materials, magnetostrictive materials, or may comprise other means, such as electromagnetic, pneumatic, hydraulic, or other possible means.

Active tuning element 415 can be represented by mechanical properties include a spring element 417 having a spring constant $k_p$, a mass $M_p$, and a controllable force element 421. Controllable force element 421 may have any phase angle and be of any magnitude within the maximum capabilities of active tuning element 415. Active tuning element 415 also includes control circuitry (not shown) for controlling the actuation of active tuning element 415. Active tuning element 415 allows for selective actuation of the tuning mass. Mechanical equivalent model 401 leads to the following equation of motion for the system:

$$\begin{bmatrix} M_{fuselage} + (R-1)^2 M_t & -R(R-1)M_t & 0 \\ -R(R-1)M_t & M_{wing} + R^2 M_t & 0 \\ 0 & 0 & M_p \end{bmatrix}$$

$$\begin{Bmatrix} \ddot{u}_{fuselage} \\ \ddot{u}_{wing} \\ \ddot{u}_{actuator} \end{Bmatrix} + \begin{bmatrix} K & -K & 0 \\ -K & K+k_p & -k_p \\ 0 & -k_p & k_p \end{bmatrix} \begin{Bmatrix} u_{fuselage} \\ u_{wing} \\ u_{actuator} \end{Bmatrix} = \begin{Bmatrix} F_p \\ 0 \\ -F_p \end{Bmatrix}$$

Figure 5B:
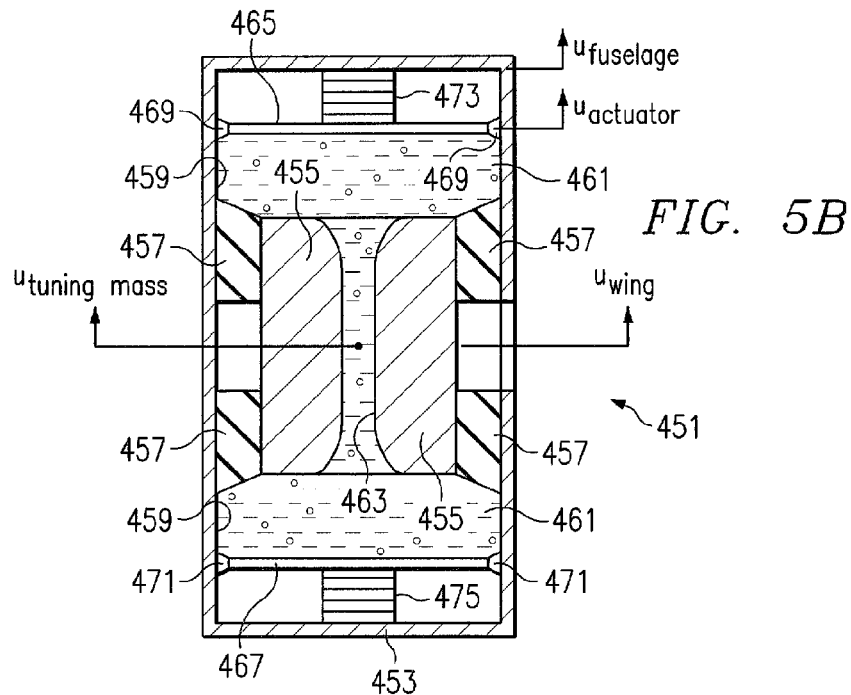
FIG. 5B is a simplified schematic shown in cross section of the tunable vibration isolator of FIG. 5A.

Referring now to FIG. 5B in the drawings, a simplified schematic of the preferred embodiment of a vibration isolator 451 according to the present invention is illustrated. Vibration isolator 451 includes a housing 453 having a hollow, generally cylindrical interior. Housing 453 would typically be coupled to the fuselage of the aircraft, i.e., the body being isolated from the vibration. A piston 455 of selected cross-sectional diameter is disposed within the interior of housing 453. Piston 455 would typically be coupled to the wing of the aircraft, i.e., the source of the vibration. A first elastomeric seal and spring member 457 resiliently seals piston 455 within the interior of housing 453.

A fluid chamber 459 is defined by the interior of housing 453 and piston 455. A known-density, vibration-isolation fluid 461, also referred to as tuning fluid, is disposed within fluid chamber 459. Tuning fluid 461 is preferably non-corrosive and environmentally safe, being low-viscosity and having a relatively high density. In addition to sealing tuning fluid 461 within fluid chamber 459, first elastomeric member 457 functions as a spring to permit piston 455 to move or oscillate relative to housing 453, while maintaining piston 455 in a central location within housing 453 when no load is applied. A tuning port 463 extends centrally through piston 455 and permits tuning fluid 461 to move from one end of fluid chamber 459 to the other.

A first actuating piston 465 is disposed within fluid chamber 461 at one end of vibration isolator 451. A second actuating piston 467 is disposed within fluid chamber 461 at the opposing end of vibration isolator 451. A second elastomeric seal and spring member 469 resiliently seals first actuating piston 465 within the interior of housing 453. In a similar fashion, a third elastomeric seal and spring member 471 resiliently seals second actuating piston 467 within the interior of housing 453. A first tunable active tuning element 473, operably associated with first actuating piston 465, is coupled to housing 453. In a similar fashion, a second tunable active tuning element 475, operably associated with second actuating piston 467, is also coupled to housing 453. First and second active tuning elements 473, 475 are each electrically coupled to control circuitry (not shown) for controlling the actuation of first and second actuating pistons 465, 467, respectively.

In this simplified representation, the engine, transmission, and propulsion system produce oscillatory forces which are transmitted through the wing member causing an oscillatory displacement $u_{wing}$ of piston 455. The displacement $u_{wing}$ of piston 455 is transmitted through elastomeric member 457 to the fuselage of the aircraft via housing 453 resulting in a displacement $u_{fuselage}$. Tuning fluid 461 within tuning port 463 opposes the oscillatory displacement $u_{wing}$ of the piston 455 with a displacement $u_{tuning}$ mass of tuning fluid 461. In addition, first and second active tuning elements 473, 475 are controlled by the control circuitry to selectively actuate first and second actuation pistons 465, 467 resulting in displacements $u_{actuator}$ of first and second actuating pistons 465, 467. Actuation of first and second actuating pistons 465, 467 at a selected frequency and amplitude amplifies the displacement $u_{tuning\ mass}$ of tuning fluid 461 and cancels out the frequency of the oscillatory forces from the wing member. In this manner the oscillatory vibration from the engine, transmission, and propulsion are not transferred through the wing member to the fuselage.

Figure 6A:
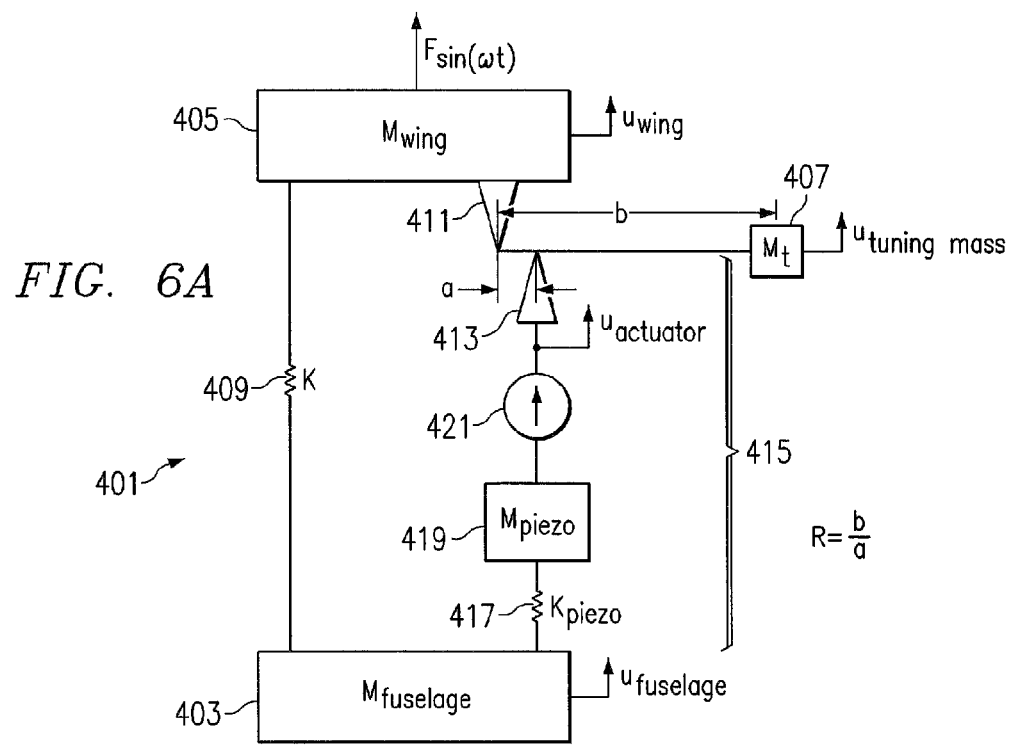
FIG. 6A is a mechanical equivalent model of an alternate embodiment of the tunable vibration isolator according to the present invention.

It should be understood that the location of active tuning element 415 does not affect its functionality. This concept is illustrated with respect to FIGS. 6A and 6B. In FIG. 6A, mechanical equivalent model 401 is again illustrated. The only difference in mechanical equivalent model 401 between FIG. 5A and FIG. 6A is the location of active tuning element 415. In FIG. 5A, active tuning element 415 is disposed between the wing member $M_{wing}$ and the tuning mass $M_t$; however, in FIG. 6A, active tuning element 415 is disposed between the fuselage $M_{fuselage}$ and the tuning mass $M_t$. In other words, active tuning element 415 may act on either the vibrating body or the body to be isolated from vibration. The equation of motion for the system of FIG. 6A is similar to the equation of motion for the system of FIG. 5A.

Referring now to FIG. 6B in the drawings, a simplified schematic of an alternate embodiment of a vibration isolator 551 according to the present invention is illustrated. Vibration isolator 551 includes a housing 553 having a hollow, generally cylindrical interior. Housing 553 would typically be coupled to the fuselage of the aircraft, i.e., the body being isolated from the vibration. A piston 555 of selected cross-sectional diameter is disposed within the interior of housing 553. Piston 555 would typically be coupled to the wing of the aircraft, i.e., the source of the vibration, via a mounting bracket 556 extends outside of and around housing 553. A first elastomeric seal and spring member 557 resiliently seals piston 555 within the interior of housing 553.

A fluid chamber 559 is defined by the interior of housing 553 and piston 555. A known-density, vibration-isolation fluid 561, similar in form and function to tuning fluid 461, is disposed within fluid chamber 559. Tuning fluid 561 is preferably non-corrosive and environmentally safe, being low-viscosity and having a relatively high density. In addition to sealing tuning fluid 561 within fluid chamber 559, first elastomeric member 557 functions as a spring to permit piston 555 to move or oscillate relative to housing 553, while maintaining piston 555 in a central location within housing 553 when no load is applied. A tuning port 563 extends centrally through piston 555 and permits tuning fluid 561 to move from one end of fluid chamber 559 to the other.

An actuation assembly 560 is coupled to the wing of the aircraft at a mounting point 562. A first tunable active tuning element 573 is disposed within actuation assembly 560, such that first active tuning element 573 may act upon mounting bracket 556 in one direction, preferably coaxial with tuning port 563. In a similar fashion, a second tunable active tuning element 575 is disposed within actuation assembly 560, such that second active tuning element may act upon mounting bracket 556 in an opposing direction to that of first active tuning element 577. Apertures 569 and 571 through actuation assembly 560 allow movement of mounting bracket 556 relative to actuation assembly 560. Actuation assembly 560 is coupled to mounting bracket 556 via a spring 542. Because first and second active tuning elements 573, 575 act upon mounting bracket 556, the actuation of first and second active tuning elements 573, 575 are transferred through mounting bracket 556 to piston 555. First and second active tuning elements 573, 575 are each electrically coupled to control circuitry (not shown) for controlling the actuation of mounting bracket 556.

In this simplified representation, the engine, transmission, and propulsion system produce oscillatory forces which are transmitted through the wing member causing an oscillatory displacement $u_{wing}$ of piston 555. The displacement $u_{wing}$ of piston 555 is transmitted through elastomeric member 557 to the fuselage of the aircraft via housing 553 resulting in a displacement $u_{fuselage}$. Tuning fluid 561 within tuning port 563 opposes the oscillatory displacement $u_{wing}$ of the piston 555 with a displacement $u_{tuning}$ mass of tuning fluid 561. In addition, first and second active tuning elements 573, 575 are controlled by the control circuitry to selectively actuate mounting bracket 556 resulting in a displacement $u_{actuator}$ of actuation assembly 560. Actuation of actuation assembly at a selected frequency and amplitude amplifies the displacement $u_{tuning\ mass}$ of tuning fluid 561 and cancels out the frequency of the oscillatory forces from the wing member.

In this manner the oscillatory vibration from the engine, transmission, and propulsion are not transferred through the wing member to the fuselage.

Figure 7C:
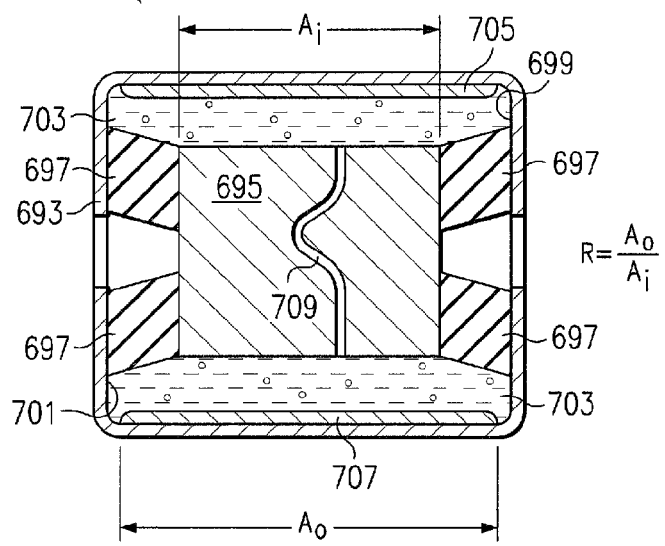
FIG. 7C is a simplified schematic shown in cross section of another alternate embodiment of the tunable vibration isolator according to the present invention.

Referring now to FIGS. 7A-7D in the drawings, simplified schematics of additional alternate embodiments of the vibration isolator according to the present invention are illustrated. In FIG. 7A, a simplified schematic of a vibration isolator 651 according to the present invention is illustrated. Vibration isolator 651 includes a housing 653 having a hollow, generally cylindrical interior. Housing 653 would typically be coupled to the fuselage of the aircraft, i.e., the body being isolated from the vibration. A piston 655 of selected cross-sectional diameter is disposed within the interior of housing 653. Piston 655 would typically be coupled to the wing of the aircraft, i.e., the source of the vibration, via a pylon mounting bracket 656. A first elastomeric seal and spring member 657 resiliently seals piston 655 within the interior of housing 653.

A fluid chamber 659 is defined by the interior of housing 653 and piston 655. A known-density, vibration-isolation tuning fluid 661 is disposed within fluid chamber 659. In addition to sealing tuning fluid 661 within fluid chamber 659, first elastomeric member 657 functions as a spring to permit piston 655 to move or oscillate relative to housing 653, while maintaining piston 655 in a central location within housing 653 when no load is applied. A tuning port 663 extends centrally through piston 655 and permits tuning fluid 661 to move from one end of fluid chamber 659 to the other. A tuning mass, or tuning rod 660, is disposed within tuning port 663. Tuning rod 660 oscillates within tuning port in response to oscillatory movement of piston 655 and tuning fluid 661. A plurality of optional bypass ports (not shown) through piston 655 restrict the axial motion of tuning rod 660.

A first tunable active tuning element 673 is disposed within housing 653 at one end of fluid chamber 659. In a similar fashion, a second active tuning element 675 is disposed within housing 653 at an opposing end of fluid chamber 659. A hydraulic ratio R is equal to the ratio of the area $A_o$ of first and second active tuning elements 673, 675 to the area $A_j$ of tuning port 663.

In FIG. 7B, a simplified schematic for another vibration isolator 681 according to the present invention is illustrated. Vibration isolator 681 includes a housing 683 having a hollow, generally cylindrical interior. Housing 683 would typically be coupled to the fuselage of the aircraft, i.e., the body being isolated from the vibration. A piston 685 of selected cross-sectional diameter $A_j$ is disposed within the interior of housing 683. In this embodiment, piston 685 would typically be coupled to the floor of the aircraft, i.e., the source of the vibration. An elastomeric seal and spring member 688 resiliently seals piston 685 within the interior of housing 683.

A fluid chamber 687 is defined by the interior of housing 683 and piston 685. A known-density, vibration-isolation tuning fluid 689 is disposed within fluid chamber 687. In addition to sealing tuning fluid 689 within fluid chamber 687, elastomeric member 688 functions as a spring to permit piston 685 to move or oscillate relative to housing 683, while maintaining piston 685 in a central location within housing 683 when no load is applied.

A tunable active tuning element 689 is disposed within housing 683 at one end of fluid chamber 687. Active tuning element 689 has a cross-sectional area $A_o$. A hydraulic ratio R is equal to the ratio of the cross-sectional area $A_o$ of active tuning element 689 to the cross-sectional area $A_j$ of piston 685. In this embodiment, there is no tuning port or tuning mass, and active tuning element 689 acts upon piston 685 via fluid 689 to counteract oscillatory forces transferred to piston 685 by the floor of the aircraft.

In FIG. 7C, a simplified schematic for another vibration isolator 691 according to the present invention is illustrated. Vibration isolator 691 is configured from two vibration isolators 681 placed end to end. Vibration isolator 691 comprises a housing 693 having a hollow, generally cylindrical interior. Housing 693 would typically be coupled to the fuselage of the aircraft, i.e., the body being isolated from the vibration. A piston 695 of selected cross-sectional diameter $A_j$ is disposed within the interior of housing 693. In this embodiment, piston 695 would typically be coupled to the floor of the aircraft, i.e., the source of the vibration. An elastomeric seal and spring member 697 resiliently seals piston 695 within the interior of housing 683.

A first fluid chamber 699 is defined by the interior of housing 693 and piston 695. Likewise, a second fluid chamber 701 is defined by the interior of housing 693 and piston 695. An incompressible fluid 703 is disposed within fluid chambers 699 and 701. In addition to sealing fluid 703 within fluid chambers 699, 701, elastomeric member 697 functions as a spring to permit piston 695 to move or oscillate relative to housing 693, while maintaining piston 695 in a central location within housing 693 when no load is applied.

A first tunable active tuning element 705 is disposed within housing 693 at one end of fluid chamber 699. In a similar fashion, a second tunable active tuning element 707 is disposed within housing 693 at the opposing end of fluid chamber 701. Active tuning elements 705, 707 have a cross-sectional area $A_o$. A hydraulic ratio R is equal to the ratio of the cross-sectional area $A_o$ of active tuning elements 705, 707 to the cross-sectional area $A_j$ of piston 695. In this embodiment, there is no tuning port and, thus, no tuning mass; and active tuning elements 705, 707 act upon piston 695 via fluid 703 to counteract oscillatory forces transferred to piston 695 by the floor of the aircraft. An optional small passage 709 may pass through piston 695 so as to place fluid chamber 699 into fluid communication with fluid chamber 701. Passage 709 allows for very low frequency mean shifts of piston 695.

Figure 7D:
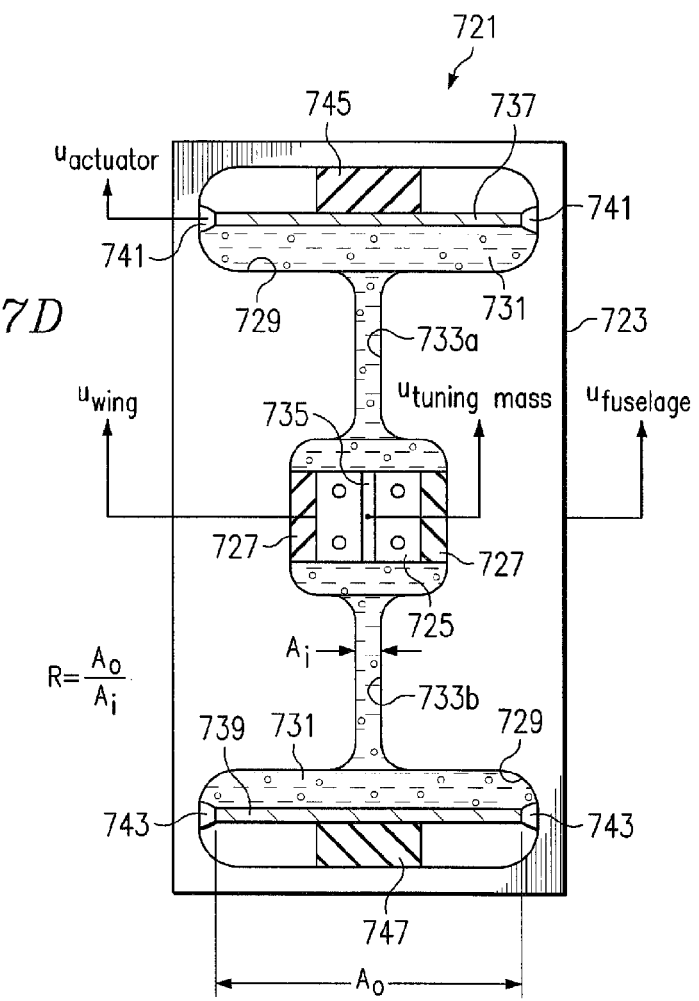
FIG. 7D is a simplified schematic shown in cross section of another alternate embodiment of the tunable vibration isolator according to the present invention.

In FIG. 7D, a simplified schematic for another vibration isolator 721 according to the present invention is illustrated. Vibration isolator 721 is similar to vibration isolator 451 of FIG. 5B with the exception that the piston assembly is configured differently. Vibration isolator 721 includes a housing 723 having a hollow, generally cylindrical interior. Housing 723 would typically be coupled to the fuselage of the aircraft, i.e., the body being isolated from the vibration. A piston 725 of selected cross-sectional diameter is disposed within the interior of housing 723. Piston 725 would typically be coupled to the wing or engine of the aircraft, i.e., the source of the vibration. A first elastomeric seal and spring member 727 resiliently seals piston 725 within the interior of housing 723.

A fluid chamber 729 is defined by the interior of housing 723 and piston 725. A known-density, vibration-isolation fluid 731, also referred to as tuning fluid, is disposed within fluid chamber 729. Tuning fluid 731 is preferably non-corrosive and environmentally safe, being low-viscosity and having a relatively high density. Fluid chamber 729 includes central fluid channels 733a and 733b on either side of piston 725.

In addition to sealing tuning fluid 731 within fluid chamber 729, first elastomeric member 727 functions as a spring to permit piston 725 to move or oscillate relative to housing 723, while maintaining piston 725 in a central location within housing 723 when no load is applied. A tuning port 735 extends centrally through piston 725 and permits tuning fluid 731 to move from one end of fluid chamber 729 to the other. In such an embodiment, tuning port 735 might have a diameter of about 0.03 inches.

A first actuating piston 737 is disposed within fluid chamber 729 at one end of vibration isolator 721. A second actuating piston 739 is disposed within fluid chamber 729 at the opposing end of vibration isolator 721. A second elastomeric seal and spring member 741 resiliently seals first actuating piston 737 within the interior of housing 723. In a similar fashion, a third elastomeric seal and spring member 743 resiliently seals second actuating piston 739 within the interior of housing 723. A first tunable active tuning element 745, operably associated with first actuating piston 737, is coupled to housing 723. In a similar fashion, a second tunable active tuning element 747, operably associated with second actuating piston 739, is also coupled to housing 723. First and second active tuning elements 745, 747 are each electrically coupled to control circuitry (not shown) for controlling the actuation of first and second actuating pistons 737 and 739, respectively.

In this simplified representation, the engine, transmission, and propulsion system produce oscillatory forces which are transmitted through the wing member causing an oscillatory displacement $u_{wing}$ of piston 725. The displacement $u_{wing}$ of piston 725 is transmitted through elastomeric member 727 to the fuselage of the aircraft via housing 723 resulting in a displacement $u_{fuselage}$. Tuning fluid 731 within tuning channels 733a and 733b, and within tuning port 735 opposes the oscillatory displacement $u_{wing}$ of the piston 725 with a displacement $u_{tuning\ mass}$ of tuning fluid 731. In addition, first and second active tuning elements 745, 747 are controlled by the control circuitry to selectively actuate first and second actuation pistons 737, 739 resulting in displacements $u_{actuator}$ of first and second actuating pistons 737, 739. Actuation of first and second actuating pistons 737, 739 at a selected frequency and amplitude amplifies the displacement $u_{tuning\ mass}$ of tuning fluid 731 and cancels out the frequency of the oscillatory forces from the wing member. In this manner the oscillatory vibration from the engine, transmission, and propulsion are not transferred through the wing member to the fuselage.

In particular, the embodiments of FIGS. 7C and 7D provide a unique capability of eliminating high steady pressure from active tuning elements 705, 707, 745, and 747 by segregating the large steady mean pressure from the oscillatory pressure. This allows active tuning elements 705, 707, 745, and 747 to operate more efficiently by staying within the allowed pressures for the materials used to form active tuning elements 705, 707, 745, and 747. Without such means, high steady pressures could be introduced due to ground-air-ground cycles in which the pylon or wing member starts at rest compressing the vibration isolator. As lift is increased, the load is lifted to a zero compressive load, and then further, such that the fuselage is suspended from the vibration isolator, placing the vibration isolator in tension. This results in very large mean pressures. For example, if active tuning element 705, 707, 745, or 747 is a piezoceramic material, it would have a maximum operating pressure of about 2,000 to 4,000 pounds per square inch. By eliminating the large mean pressure shift, the active tuning elements 705, 707, 745, and 747 can operate more efficiently without failing.

Figure 13:
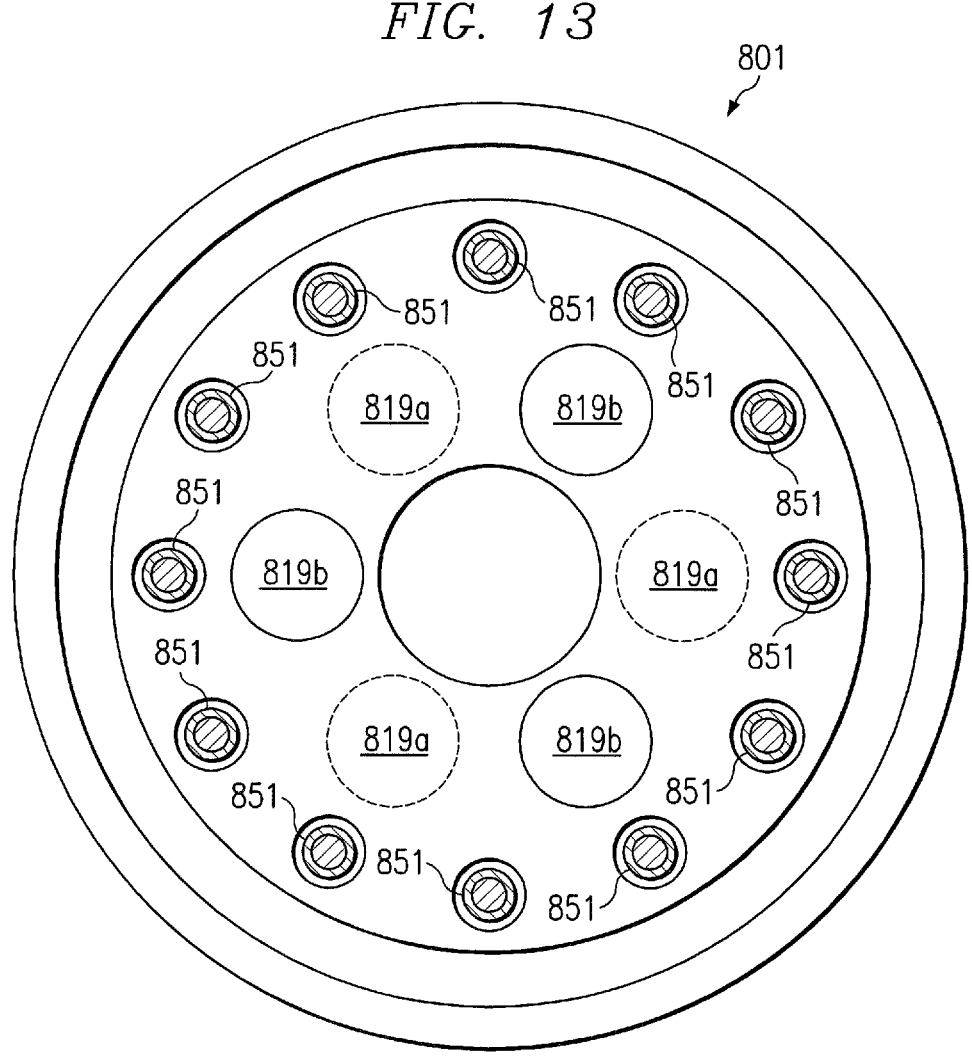
FIG. 13 is a cross-sectional schematic showing the arrangement of the two sets of three active tuning elements according to the present invention taken at XIII-XIII of FIG. 8.

Referring now to FIGS. 8 and 13 in the drawings, the preferred embodiment of a physical configuration of a LIVE unit 801 according to the present invention is illustrated in a cross-sectional view. Although LIVE unit 801 will be described herein with reference to "upper components and "lower" components, it will be understood that LIVE unit 801 functions independent of its orientation. LIVE unit 801 is installed on aircraft 11, 111, or 211. LIVE unit 801 includes a housing 803 having a hollow, generally cylindrical interior having a longitudinal axis 802. Housing 803 is coupled to the fuselage of the aircraft, i.e., the body being isolated from the vibration, at mounting apertures 804. A piston 805 of selected cross-sectional diameter is disposed within the interior of housing 803. Piston 805 is coupled to the wing members of the aircraft, i.e., the source of the vibration, as will be explained below. Piston 805 includes an upper convex flange 807 and an opposing lower convex flange 808.

Upper convex flange 807 is coupled to an upper elastomeric seal member 809, and lower convex flange 808 is coupled to a lower elastomeric seal member 810. Upper and lower elastomeric seal members 809 and 810 include inner steel rings 809a and 810a for coupling to upper and lower convex flanges 807 and 808 of piston 805, central elastomeric seals 809b and 810b to seal a tuning fluid 812 within LIVE unit 801, and outer steel rings 809c and 810c for coupling to an upper spacer 814 and a lower spacer 816, respectively. Preferably, upper and lower elastomeric seal members 809 and 810 each have an effective diameter of about 6.00 inches.

An upper fluid chamber 831 is generally defined by upper convex flange 807, upper elastomeric seal member 809, and an upper cap 833. Upper cap 833 includes a mounting aperture 835 for coupling LIVE unit 801 to the wing member of the aircraft. In a similar fashion, a lower fluid chamber 837 is generally defined by lower convex flange 808, lower elastomeric seal member 810, and a lower cap 839. A vibration isolation fluid, or tuning fluid, 841 fills upper and lower fluid chambers 831 and 837. Tuning fluid 841 is preferably a silicone oil with low viscosity. Such a tuning fluid 841 provides good lubricity with low density. Having a virtually incompressible liquid with reasonably low density reduces the parasitic weight in upper and lower fluid chambers 831 and 837.

An upper concave plate 811 is matingly in force transference contact with upper convex flange 807. In a similar fashion, an opposing lower concave plate 813 is matingly in force transference contact with lower convex flange 808. Upper and lower concave plates 811 and 813 are configured to receive a plurality of piston receiver plates 815. In a similar fashion, housing 803 is configured to receive a plurality of housing receiver plates 817. Piston receiver plates 815 and housing receiver plates 817 are paired together, such that each pair receives one of a plurality of active tuning elements 819a and 819b. Active tuning elements are electrically coupled to and controlled by control circuitry (not shown) via electrical leads 820 which pass through apertures 824 in housing 803. In the preferred embodiment, active tuning elements 819a and 819b are piezoceramic elements that oscillate in the range of about 16.6 Hz (airplane mode operation) to about 19.9 Hz (helicopter mode operation) to counteract the vibration of the wing member. It should be understood that active tuning elements 819a and 819b may be comprised of other smart materials, such as electrostrictive, magnetostrictive, or may comprise other means, such as electromagnetic, pneumatic, hydraulic, or other possible means.

It is desirable that active tuning elements 819a and 819b act in a longitudinal direction only. Therefore, in the preferred embodiment of the present invention, six active tuning elements are spatially aligned around LIVE unit 801, such that three extend downward from the upper portion of housing 803, i.e., 819b; and three extend upward from the lower portion of housing 803, i.e., 819a. Because three points define a plane, the mating of upper and lower concave plates 811 and 813 to upper and lower convex flanges 807 and 808 of piston 805 serves to equalize the load between the three pairs of active tuning elements 819a and 819b. Loads in active tuning elements 819a and 819b remain essentially axial along axis 802, thereby minimizing moments. To further reduce undesirable moments, each active tuning element 819a and 819b includes a hemispherical end cap 821 on each end; and a thin elastomeric layer interface 823 is disposed between each end cap 821 and each piston receiver plate 815 and each housing receiver plate 817. In addition, an upper anti-rotation flexure 845 is disposed between and coupled to housing 803 and upper concave plate 811. Likewise, a lower anti-rotation flexure 847 is disposed between and coupled to housing 803 and lower concave plate 813. Anti-rotation flexures 845 and 847 are preferably steel strips which ensure that upper and lower concave plates 811 and 813 may move in the axial direction relative to housing 803, but may not rotate relative to housing 803.

The spring force between housing 803 and piston 805 is provided by an upper spring plate assembly 861 and a lower spring plate assembly 863. Upper and lower spring plate assemblies 861 and 863 provide a stiffness of about 300,000 pounds per inch. Upper and lower spring plate assemblies 861 and 863 are configured to allow piston 805 to oscillate in the axial direction relative to housing 803.

The components of LIVE unit 801 are resiliently held together by a plurality of fasteners 851 which align and clamp together lower cap 839, lower spacer 816, lower spring plate assembly 863, housing 803, upper spring plate assembly 861, upper spacer 814, and upper cap 833.

A central channel 871 extends axially through the center of piston 805. In the preferred embodiment, central channel 871 receives a tubular shaft 873. Tubular shaft 873 is retained within tuning central channel 871 by clamping a flange portion 879 between retaining rings 875 and 877. A pin 880 may be used to secure retaining ring 877 in place.

Tubular shaft 873 includes an axial tuning port 881, preferably having a diameter of about 0.687 inches. A tuning mass 883 is a rigid body slidingly disposed within tuning port 881. Tuning mass 883 is preferably a tungsten rod. Tuning mass 883 may be one of at least two different weights: (1) a heavier one for airplane mode operation at 16.6 Hz; and (2) a lighter one for helicopter mode operation at 19.9 Hz. An upper bumper 860 and a lower bumper 862 protect tuning mass 883, upper cap 833, and lower cap 839 from damage in the event of an over-travel by tuning mass 883.

An upper guide ring 885 and a lower guide ring 887, each preferably made of brass, align and guide tuning mass 883 as tuning mass 883 slides up and down in tuning port 881 in response to oscillatory forces from the wing member of the aircraft. In addition, upper and lower guide rings 885 and 887 allow activation of an upper one-way bypass port 889 and a lower one-way bypass port 891, depending upon the axial location of tuning mass 883. Upper and lower bypass ports 889 and 891 prevent overtravel of the tuning mass during large changes in steady or quasisteady loads, such as would occur during ground-air-ground cycles or maneuvers. Upper and lower bypass ports 889 and 891 provide fluid communication between upper and lower fluid chambers 831 and 837, and allow the liquid pressures in upper and lower fluid chambers 831 and 837 to equalize when the amplitude of the oscillatory motion of tuning mass 883 is sufficiently large, thereby limiting the amplitude of tuning mass 883. Thus when guide rings 885 and 887 travel beyond the closest bypass port 889 or 891, the pressures in upper and lower fluid chambers 831 and 837 equalize and the velocity of tuning mass 883 peaks.

One-way flapper valves (not shown) are located in the bypass passage and cover the backside of bypass ports 889 and 891. The bypass passages and associated one-way flapper valves act to center the oscillating tuning mass 883 axially within tuning port 881.

Figure 9:
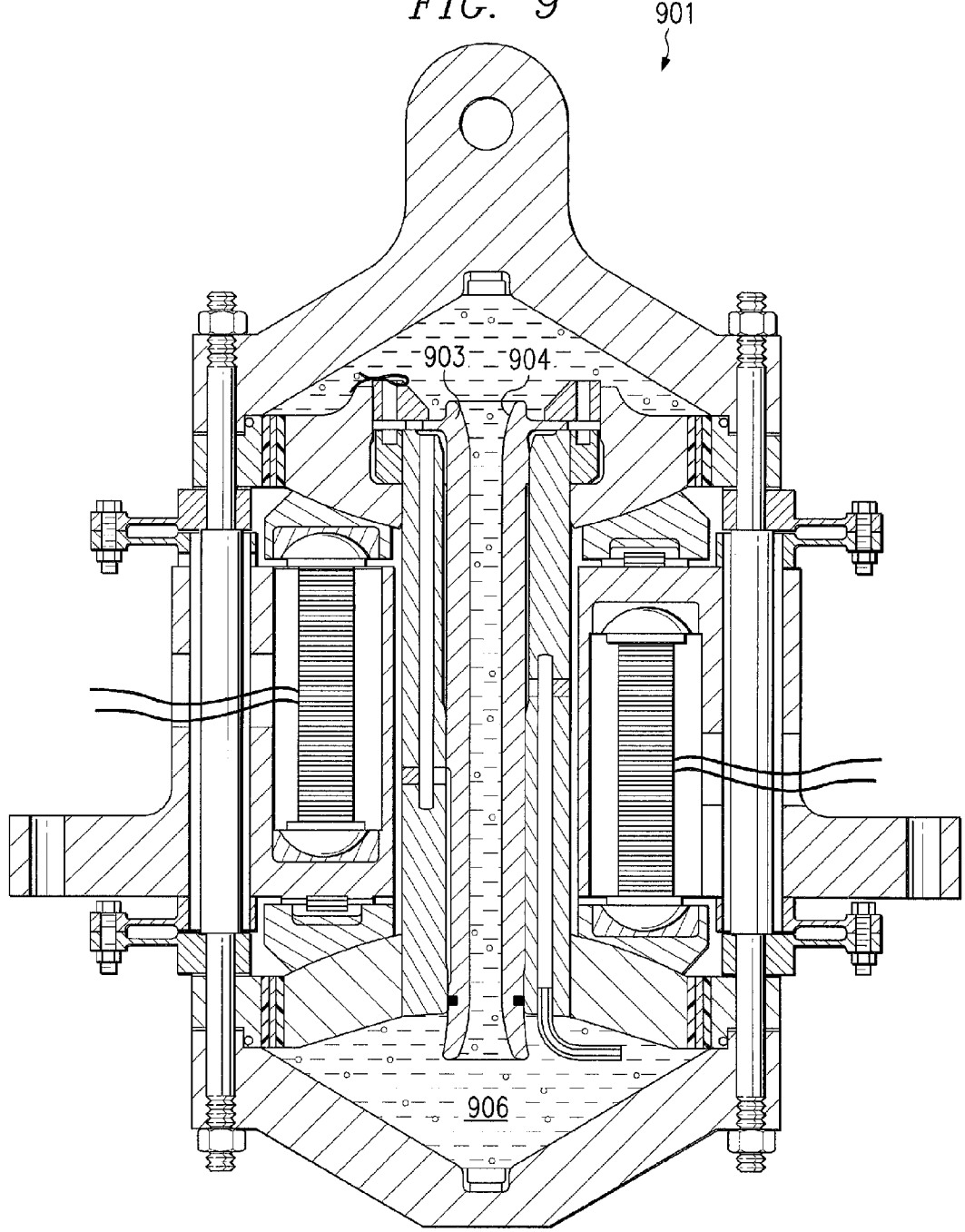
FIG. 9 is a cross-sectional view of the an alternate embodiment of the tunable vibration isolator according to the present invention.

Referring now to FIG. 9 in the drawings, an alternate embodiment of a physical configuration of a vibration isolator 901 according to the present invention is illustrated in a cross-sectional view. All of the components of vibration isolator 901 are identical in form and function as the components of LIVE unit 801, with the exception that tubular shaft 873 and tuning mass 883 has been replaced with a tubular flow port 903. Tubular flow port 903 includes a central tuning passage 904. Tubular flow port 903 is configured to seal off upper and lower bypass valves 889 and 891. No solid tuning mass is necessary in vibration isolator 901. In other words, LIVE unit 801 uses a solid tuning mass approach, and vibration isolator 903 uses a liquid tuning mass approach.

It is preferred that the diameter of central tuning passage 904 makes the area ratio, or hydraulic ratio, R, for liquid tuning mass equal to 360. This amplification ratio may result in high viscous damping due to the high fluid velocity. However, this approach offers a reduced complexity design.

In the liquid tuning mass approach of FIG. 9, tuning fluid 906 is preferably non-corrosive and environmentally safe, being low-viscosity and having a relatively high density. The silicone oil which is preferred in the solid tuning mass approach of FIG. 8 is not used in the liquid tuning mass approach, because it is desirable that the liquid tuning mass have greater density with slightly less viscosity. Although the tuning mass liquid's lubricity properties are not as good as silicone oil, there is no need for good lubricity because there are no sliding parts in the liquid tuning mass approach.

Figure 10:
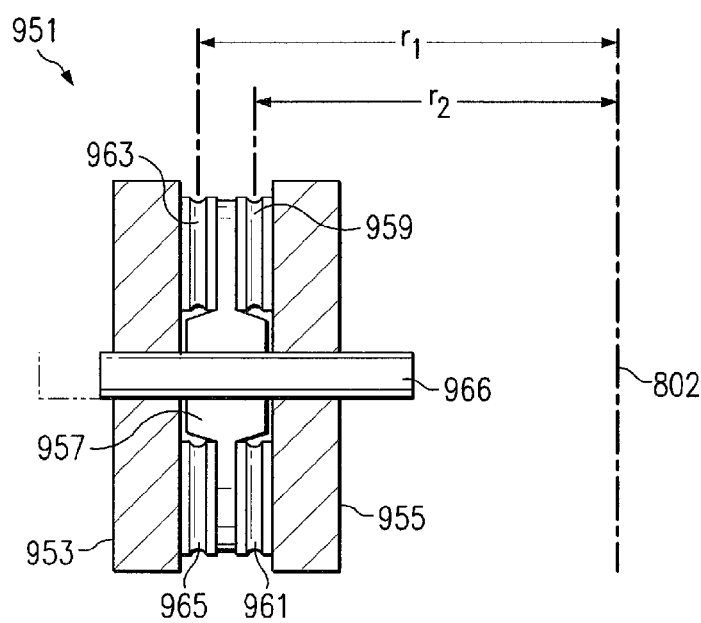
FIG. 10 is a cross-sectional view of a frequency step change mechanism for use with the vibration isolator according to the present invention.

Referring now to FIG. 10 in the drawings, a frequency step change mechanism 951 is illustrated. Frequency step change mechanism 951 allows step tuning for treating principal vibration at two different frequencies, such as 16.6 Hz and 19.9 Hz. Frequency step change mechanism 951 may be used in place of upper and lower elastomeric seal members 809 and 810. Frequency step change mechanism 951 includes an outer housing 953, an inner housing 955, and an intermediate ring 957. An inner-upper elastomer 959 and an inner-lower elastomer 961 are disposed between inner housing 955 and intermediate ring 957. An outer-upper elastomer 963 and an outer-lower elastomer 965 are disposed between inner housing 955 and intermediate ring 957. A shuttle pin 966 locks intermediate ring 957 to either inner housing 955 or outer housing 953. When locked to inner housing 955, the effective piston radius is $r_1$. When locked to outer housing 953, the effective piston radius is $r_2$. For example, with the liquid tuning approach of FIG. 9, the outer piston radius, $r_1$, results in an area ratio R=360.5, providing a passive (open-loop) isolation frequency of 16.6 Hz. To increase the isolation frequency to 19.9 Hz, the area ratio, R, must be decreased to approximately 300. This can be accomplished by sliding shuttle pin 966 radially inward, thereby locking out outer-upper and outer-lower elastomers 963 and 965, and releasing inner-upper and inner-lower elastomers 959 and 961, so that the piston radius becomes $r_2$. With a separation between the inner and outer elastomers, the piston radius is reduced, decreasing the area ratio, R, to 300.8.

Figure 11:
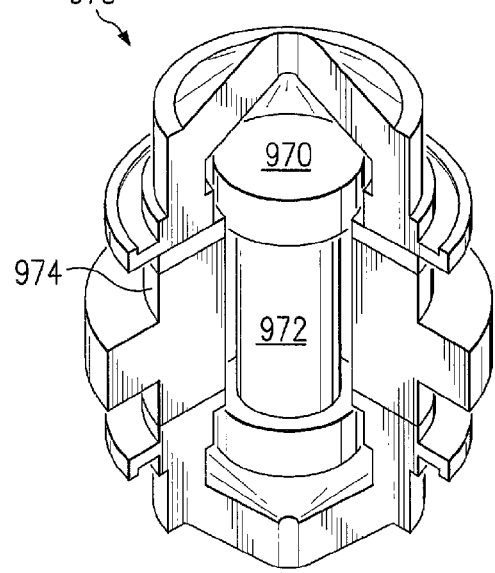
FIG. 11 is a perspective view of a fluid structure model of the vibration isolator according to the present invention.

Referring now to FIG. 11 in the drawings, a coupled fluid structure model of the vibration isolator 973 of the present invention is illustrated. A computer generated analytical model of vibration isolator 973 was created and analyzed to determine the driving point stiffness at the active tuning element input. The static stiffness of vibration isolator 973 was analyzed by fixing a tuning mass 970 to a piston 972. An actuation force was applied across stack actuators 974, and the driving point displacement was calculated. From this analysis, the driving point stiffness was determined to be about the same total axial stiffness of the six piezoceramic actuators alone. Thus, the efficiency may be reduced because some of the actuator motion may be used to elastically strain the structure of vibration isolator 973, rather than providing useful work in accelerating tuning mass 972.

Figure 12:
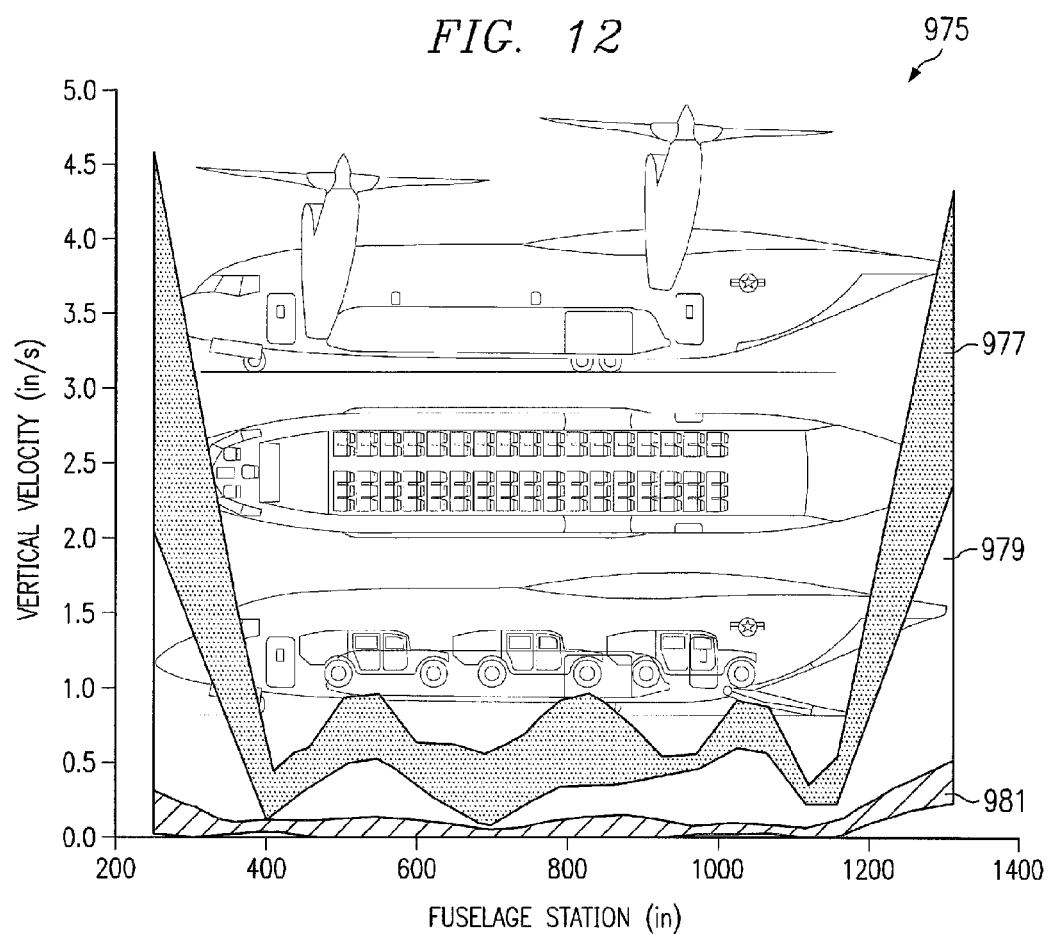
FIG. 12 is a plot of vertical velocity versus fuselage station for the tunable vibration isolator according to the present invention.

Referring now to FIG. 12 in the drawings, a computer generated plot 975 of vertical velocity versus fuselage station for the tunable vibration isolator according to the present invention, as used on quad tilt rotor aircraft 211 of FIG. 3, is illustrated. Plot 975 shows the fuselage vibration envelope for the vibration isolator of the present invention. Region 977 is a high baseline region representing no vibration isolation; region 979 is a passive region representing vibration isolation without active tuning having; and region 981 represents an active region with active tuning of vibration isolation.

Figure 14:
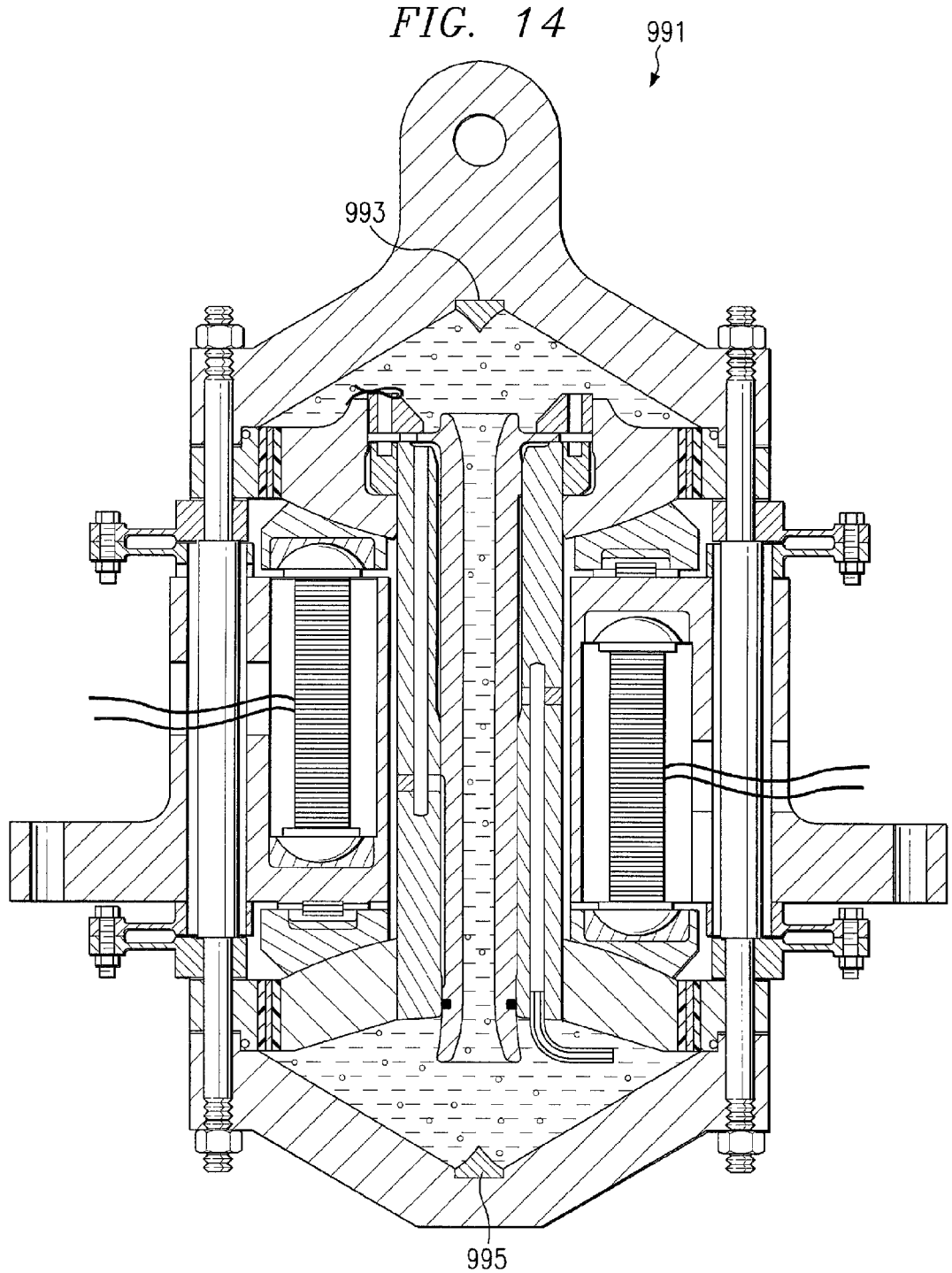
FIG. 14 is a cross-sectional view of an alternate embodiment of the tunable vibration isolator of FIG. 8.
Figure 15:
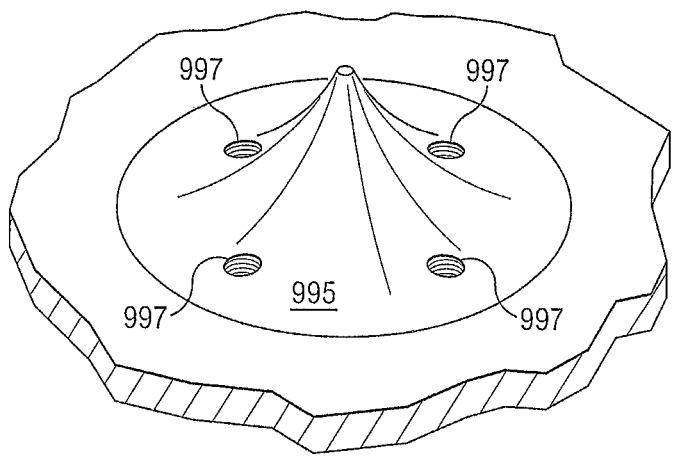
FIG. 15 is an enlarged perspective view of the flow diverter of FIG. 14.

Referring now to FIGS. 14 and 15 in the drawings, a LIVE unit 991, which is an alternate embodiment of LIVE unit 801, is illustrated. In this embodiment, upper bumper 860 and lower bumper 862 of LIVE unit 801 are replaced by flow diverters 993 and 995. Flow diverters 993 and 995 are generally conical in shape, preferably having a slightly concaved surface. As is shown in FIG. 15, flow diverters 993 and 995 may include installation apertures 997 to facilitate the installation of flow diverters 993 and 995 into upper cap 833 and lower cap 839. It will be appreciated that other suitable installation means may be utilized. It is preferred that installation apertures be plugged after installation to provide a smooth surface for diverting the tuning fluid. Flow diverters 993 and 995 divert the flow of the tuning fluid and significantly increase the performance of LIVE unit 991.

Figure 16:
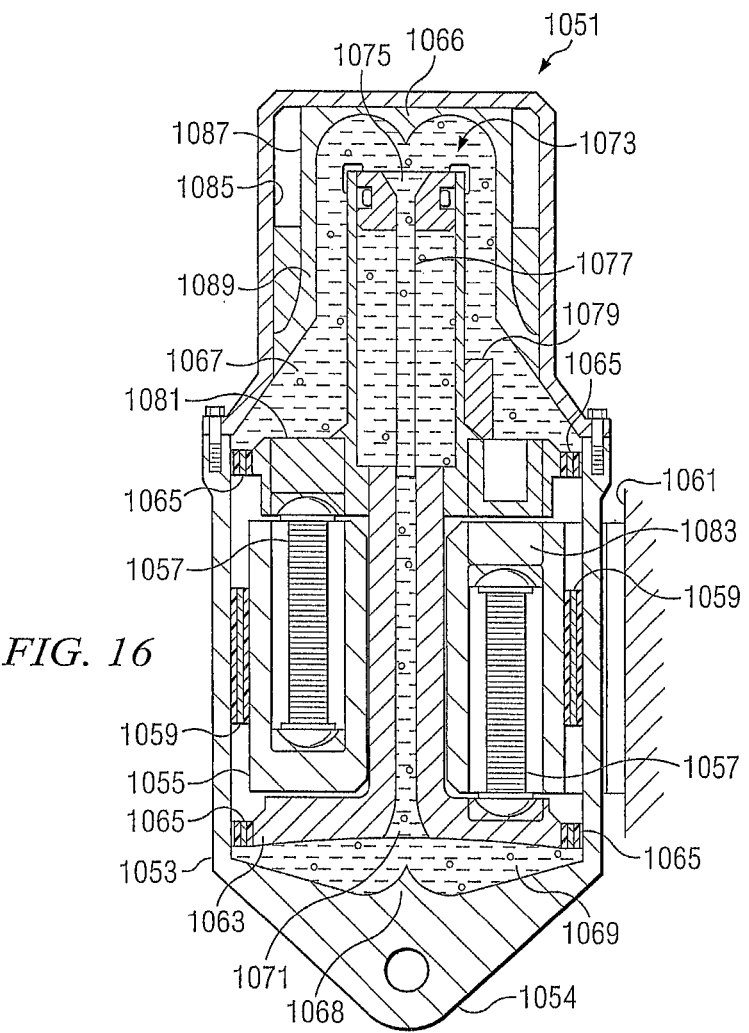
FIG. 16 is a cross-sectional schematic of another alternate embodiment of the tunable vibration isolator according to the present invention.

Referring now to FIG. 16 in the drawings, an alternate embodiment of the vibration isolator of the present invention is illustrated. In this embodiment, a dual frequency LIVE unit 1051, similar to LIVE unit 801, includes a means for actively tuning the frequency of the unit. LIVE unit 1051 includes a main housing 1053 having a mounting portion 1054 that is configured for attachment to a structure for which vibration is to be isolated, such as the fuselage of an aircraft.

A piston 1063 is resiliently coupled to main housing 1053 by elastomeric seals 1065. Piston 1063, main housing 1053, and elastomeric seals 1065 define an upper fluid chamber 1067 and a lower fluid chamber 1069. A fluid tuning passage 1071 passes axially through piston 1063, so as to place upper fluid chamber 1067 and lower fluid chamber 1069 in fluid communication. Flow diverters 1066 and 1068, similar to flow diverters 993 and 995, are disposed within upper fluid chamber 1067 and lower fluid chamber 1069, respectively. The axial length of tuning passage 1071 may be selectively changed by adjusting a trombone-type sliding tuner 1073.

Tuner 1073 includes a fluid exit port 1075 on one end and an elongated tubular shaft 1077 that telescopes into fluid tuning passage 1071 on the other end. Tuner 1073 operates between an extended position, which is shown in FIG. 16, and a retracted position, in which exit port 1075 is retracted downward against the upper surface of piston 1063. When tuner 1073 is in the extended position, LIVE unit 1051 operates at a first selected frequency; and when tuner 1073 is in the retracted position, LIVE unit 1051 operates at a higher, second selected frequency. In the preferred embodiment, the first frequency is about 16.6 Hz, and the second frequency is about 19.9 Hz. This dual frequency capability is particularly useful in tiltrotor aircraft applications, as the rotors for such aircraft generate one harmonic vibration while in airplane mode, and another harmonic vibration while in helicopter mode. A pumping means 1079 (not shown in detail) is operably associated with tuner 1073 for sliding tuner 1073 between the extended and retracted positions.

An actuator housing 1055 that houses a plurality of piezoceramic actuators 1057 is rigidly connected to a vibrating structure, such as a wing spar 1061. In addition, actuator housing 1055 is resiliently coupled to main housing 1053 by an elastomeric seal 1059. Each piezoceramic actuator 1057 is held in place at one end by a first preload screw 1081 carried by piston 1063, and held in place at the other end by a second preload screw 1083 carried by actuator housing 1055. In this manner, piezoceramic actuators 1057 communicate with piston 1063 only through actuator housing 1055. The primary stiffness for LIVE unit 1051 is provided by elastomer 1059.

An accumulator chamber 1085 for collecting air and other gas bubbles in the system is disposed within main housing 1053. A tiny fluid passage 1087 extends from the top of upper fluid chamber 1067 to the bottom of accumulator chamber 1085. In embodiments where accumulator chamber 1085 is not located at the top of main housing 1053, it is preferred that a preloaded one-way valve 1089 be disposed within fluid passage 1087 to "pump" the bubbles down into accumulator chamber 1085. This pumping action is possible due to the sinusoidal oscillating pressure in upper fluid chamber 1067 relative to the steady pressure of accumulator chamber 1085. During every cycle of higher pressure in upper fluid chamber 1067, one-way valve 1089 opens, thereby allowing the gas bubble to flow through fluid passage 1087, and eventually, into accumulator chamber 1085. Pre-loaded one-way valve 1089 allows steady pressure relief, i.e., balance, without allowing oscillatory pressure into accumulator chamber 1085, which is to be avoided, as such oscillatory pressure in accumulator chamber 1085 affects the system dynamics, i.e., may shift the tuning frequency.

Referring now to FIGS. 17A-21 in the drawings, additional alternate embodiments of the piezoelectric liquid inertia vibration eliminator according to the present invention are illustrated. The present invention represents a means for producing active vibration attenuation for reducing vibration in critical areas of rotorcraft airframes using self-actuating structures, sensors, and control algorithms that result in systems with minimum weight and power requirements. These self-actuating structures utilize piezoelectric actuation to enable active vibration suppression combined with passive attenuation of rotor induced vibration. Thus, the embodiments of FIGS. 17A-21 are particularly well suited for crew seat mounts and payload mounts in rotorcraft and other aircraft. However, it should be understood that the piezoelectric liquid inertia vibration eliminators shown in FIGS. 17A-21 may be used in a wide variety of applications.

Figure 17A:
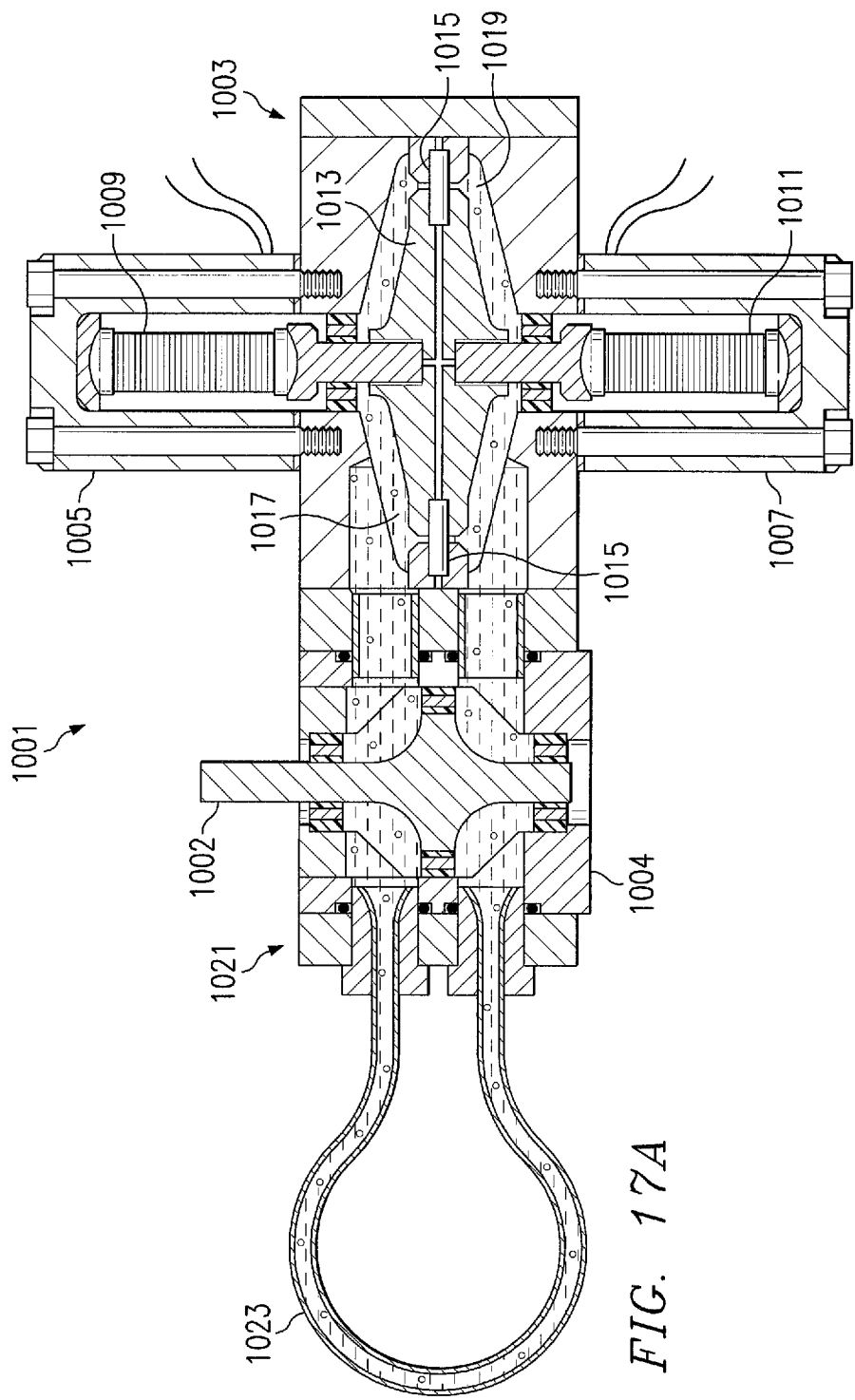
FIG. 17A is a cross-sectional view of another alternate embodiment of the tunable vibration isolator according to the present invention.

Referring now specifically to FIG. 17A in the drawings, a piezoelectric LIVE unit 1001 is illustrated in a cross-sectional view. LIVE unit 1001 is a localized active vibration treatment that can be used to isolate a payload, such as a crew seat in a rotorcraft, from a vibrating structure, i.e., a fuselage subject to main rotor b/rev vibration. The vibrating structure (not shown) is coupled to a piston 1002 housed in a piston housing 1004.

LIVE unit 1001 includes a hydraulically amplified piezo-actuator module 1003 for housing two axially aligned piezoceramic stacks 1005 and 1007. Piezoceramic stacks 1005 and 1007 include piezoceramic actuators 1009 and 1011 that are preferably on the line-of-action of the static load path. Piezoceramic actuators 1009 and 1011 selectively actuate a stroke-amplifying piston 1013. Piston 1013 is held in place by an elastomeric seal 1015. Piston 1013, elastomeric seal 1015, and piezoactuator module 1003 define two fluid chambers 1017 and 1019 within piezoactuator module 1003. A tuning unit 1021 is coupled to piezoactuator module 1003, such that a fluid tuning passage 1023 is in fluid communication with fluid chambers 1017 and 1019. A selected tuning fluid is disposed within fluid chambers 1017 and 1019 and fluid tuning passage 1021. Piezoceramic stacks 1005 and 1007 operate out-of-phase to augment the motion of the fluid tuning mass.

LIVE unit 1001 actively attenuates transmissibility between the fuselage and crew seat. It will be appreciated that the LIVE unit 1001 is readily transportable to active mounts for other sensitive components on any manned or unmanned rotorcraft.

Figure 17B:
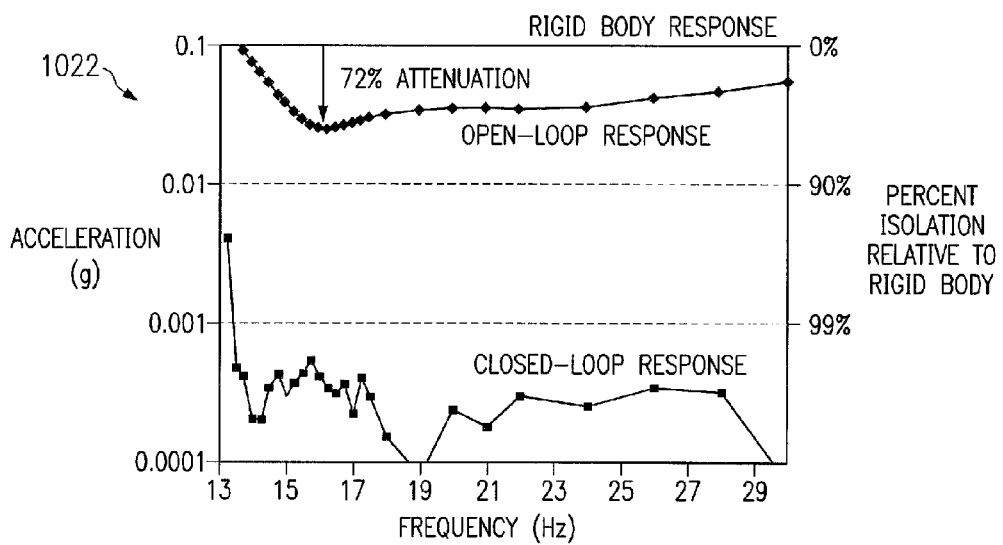
FIG. 17B is a chart demonstrating the active attenuation for the tunable vibration isolator of FIG. 17A.

Referring now specifically to FIG. 17B in the drawings, a chart 1022 demonstrates an active attenuation for LIVE mount 1501 of greater than 99% (−40 dB) over a wide frequency band, i.e., from 13.5 to 30 Hz, with very low power requirements, for example, less than 4 W. It will be appreciated that the 30-Hz upper frequency limitation is from a switching amplifier power supply system used during the test, not from piezoceramic actuators 1009 or mount hardware.

Figure 17C:
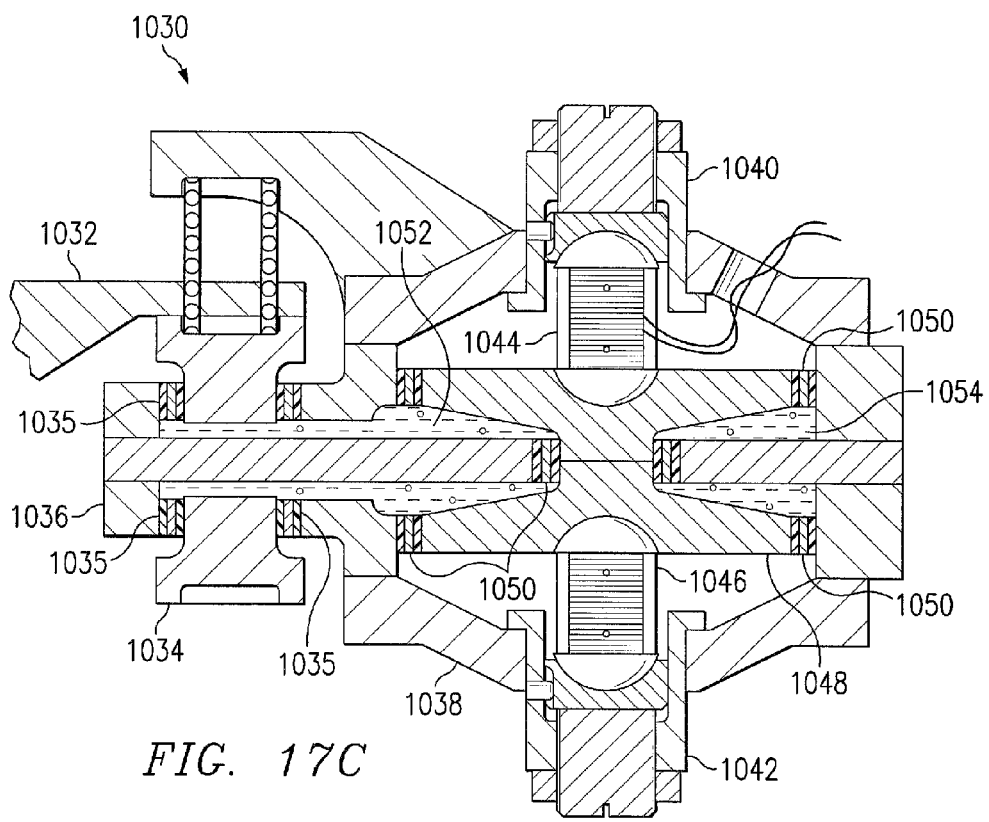
FIG. 17C is a cross-sectional view of another alternate embodiment of the tunable vibration isolator according to the present invention.

Referring now specifically to FIG. 17C in the drawings, another piezoelectric LIVE unit 1030 is illustrated in a cross-sectional view. LIVE unit 1030 is also a localized active vibration treatment that can be used to isolate a payload, such as a crew seat in a rotorcraft, from a vibrating structure, i.e., an airframe 1032 subject to main rotor b/rev vibration. Airframe 1032 is coupled to a piston 1034 housed in a piston housing 1036. Piston 1034 is resiliently carried within housing by elastomeric seals 1035.

LIVE unit 1030 includes a hydraulically amplified piezo-actuator module 1038 for housing two axially aligned piezoceramic stacks 1040 and 1042. Piezoceramic stacks 1040 and 1042 include piezoceramic actuators 1044 and 1046 that are preferably on the line-of-action of the static load path. Piezoceramic actuators 1044 and 1046 selectively actuate a stroke-amplifying piston 1048. Piston 1048 is held in place by elastomeric seals 1050. Piston 1034, elastomeric seals 1035, piston 1048, and elastomeric seals 1050 define two fluid chambers 1052 and 1054 within LIVE unit 1030. A selected tuning fluid is disposed within fluid chambers 1052 and 1054. Piezoceramic actuators 1044 and 1046 operate out-of-phase to augment the motion of the fluid tuning mass.

LIVE unit 1030 actively attenuates transmissibility between airframe 1032 and the crew seat of other isolated object. It will be appreciated that the LIVE unit 1030 is readily transportable to active mounts for other sensitive components on any manned or unmanned rotorcraft.

Figures 18, 19A, 19B:
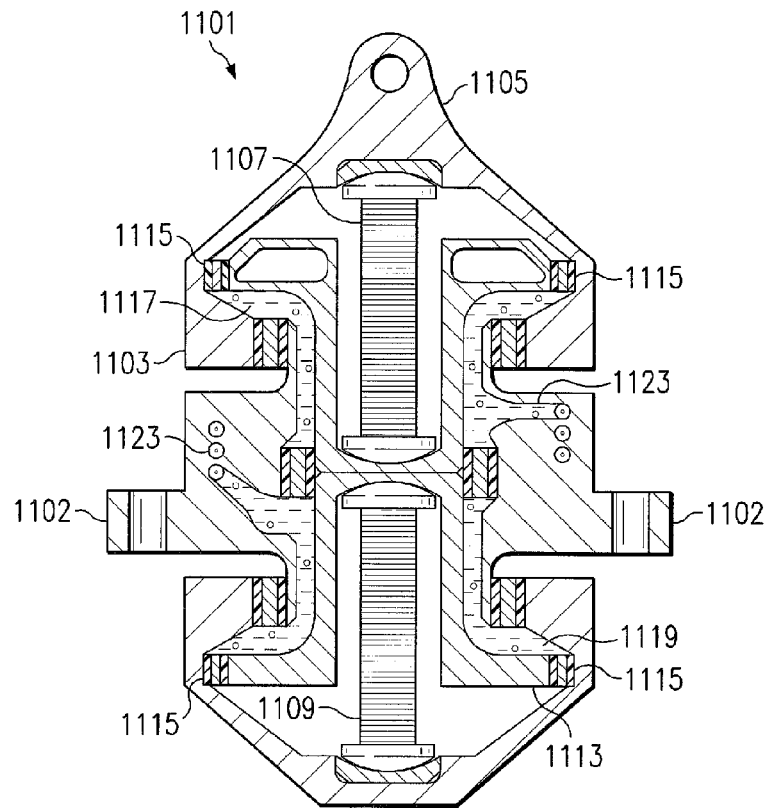
FIG. 18 is a cross-sectional view of another alternate embodiment of the tunable vibration isolator according to the present invention.
FIGS. 19A-19C are the equations for the isolation frequency, the area ratios, and the length and number of turns of the fluid tuning passage for the vibration isolator of FIG. 18.

Referring now specifically to FIG. 18 in the drawings, another piezoelectric LIVE unit 1101 is illustrated in a cross-sectional view. In this embodiment, a housing 1103 having a mounting portion 1105 houses two axially aligned piezoceramic actuators 1107 and 1109. Housing 1103 includes mounting brackets 1102 to facilitate the connection of LIVE unit 1101 to a vibrating structure (not shown).

Piezoceramic actuators 1107 and 1109 selectively actuate a stoke amplifying piston 1113. Piston 1113 is held in place by elastomeric seals 1115. Housing 1103, piston 1113, and elastomeric seals 1115 define two fluid chambers 1117 and 1119 within housing 1103. A coiled fluid tuning passage 1123, preferably disposed within the walls of housing 1103, is in fluid communication with fluid chambers 1117 and 1119. A selected tuning fluid is disposed within fluid chambers 1117 and 1119 and fluid tuning passage 1123. Piezoceramic actuators 1107 and 1109 operate out-of-phase to augment the motion of the fluid tuning mass.

Figures 19C, 20A:
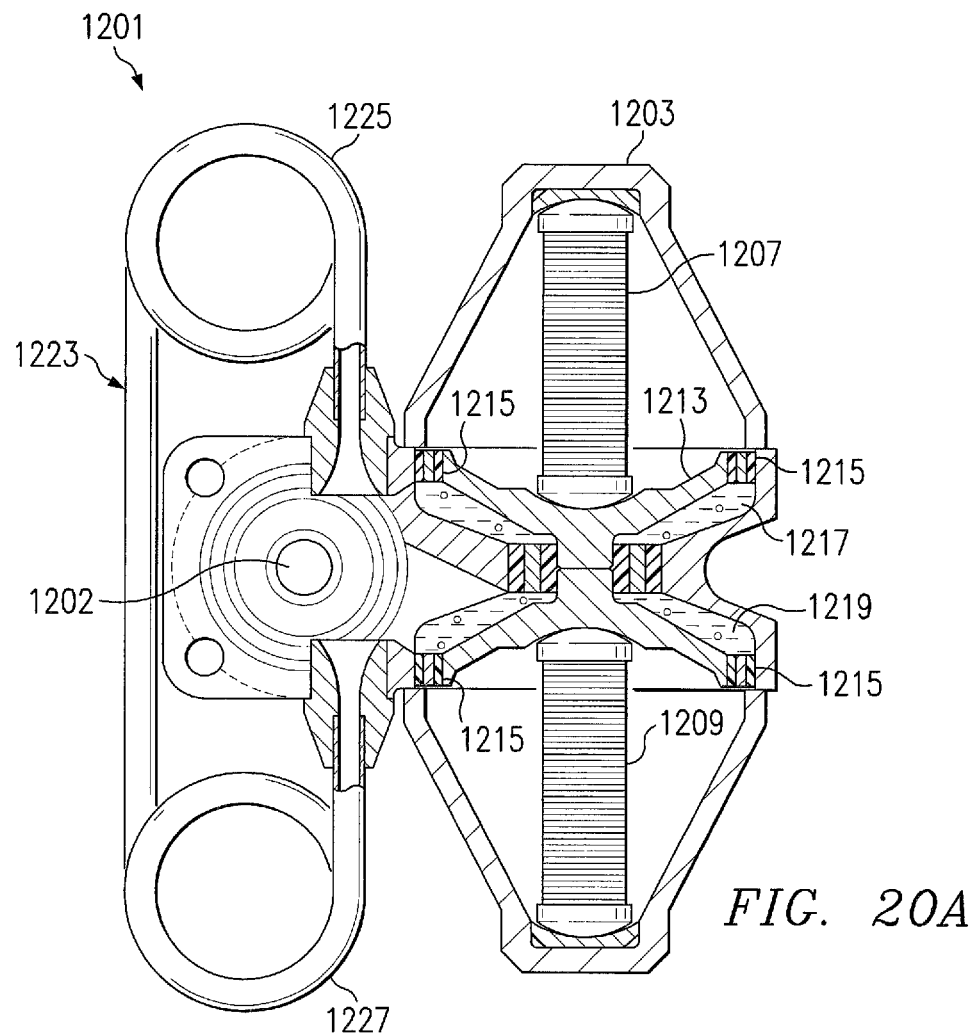
FIGS. 20A and 20B are cross-sectional views of another alternate embodiment of the tunable vibration isolator according to the present invention.

Referring now specifically to FIGS. 19A-19C in the drawings, the equations for the isolation frequency, the area ratios, and the length and number of turns of the fluid tuning passage for LIVE unit 1101 of FIG. 18, respectively, are illustrated. It will be appreciated that these equations will vary depending upon the configuration of the LIVE unit.

Figure 20B:
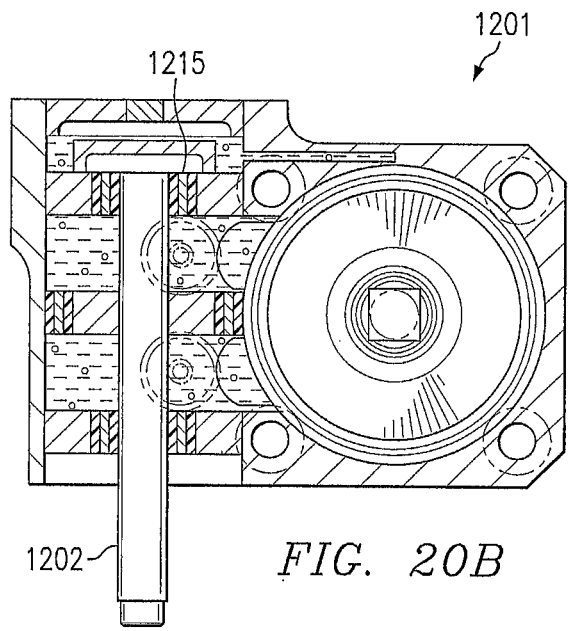

Referring now specifically to FIGS. 20A and 20B in the drawings, another piezoelectric LIVE unit 1201 is illustrated in longitudinal and transverse cross-sectional views. In this embodiment, a housing 1203 houses two axially aligned piezoceramic actuators 1207 and 1209. Housing 1203 houses a piston 1202 to facilitate the connection of LIVE unit 1201 to a vibrating structure (not shown).

Piezoceramic actuators 1207 and 1209 selectively actuate a stroke-amplifying piston 1213. Piston 1213 is held in place by elastomeric seals 1215. Housing 1203, piston 1213, and elastomeric seals 1215 define two fluid chambers 1217 and 1219 within housing 1203. A fluid tuning passage 1223 having a first set of coils 1225 and a second set of coils 1227 is in fluid communication with fluid chambers 1217 and 1219. A selected tuning fluid is disposed within fluid chambers 1217 and 1219 and fluid tuning passage 1223. Piezoceramic actuators 1207 and 1209 operate out-of-phase to augment the motion of the fluid tuning mass.

Figure 21:
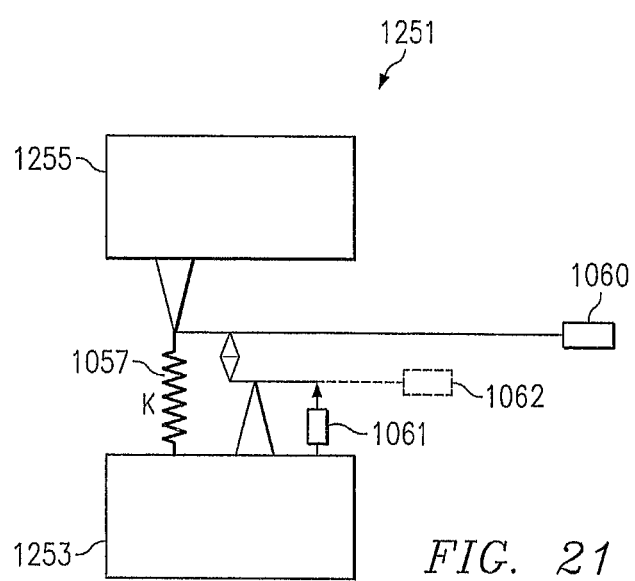
FIG. 21 is a mechanical equivalent model for the alternate embodiments of the tunable vibration isolators of FIGS. 17A, 17C, 18, 20A, and 20B.

Referring now to FIG. 21 in the drawings, a mechanical equivalent model 1251 representative of the LIVE units of FIGS. 17A, 17C, 18, 20A, and 20B is illustrated. Mechanical equivalent model 1251 includes a vibrating mass 1253 and an isolated mass 1255 coupled together through a tunable LIVE unit comprising a spring 1057, a first tuning mass 1060, a solid-state actuator 1061, and an optional second tuning mass 1062 shown in dashed lines. Solid-state actuator 1061 enhances the operation of tuning masses 1060 and 1062. Solid-state actuator 1061 is preferably a piezoceramic actuator, but may be an electrostrictive material, a magnetostrictive material, or any other suitable solid-state actuator.

It will be appreciated that the LIVE unit 1001 of FIG. 17 would include second tuning mass 1062, but that LIVE units 1101 and 1201 of FIGS. 18 and 20A and 20B would not include second tuning mass 1062, although LIVE units 1101 and 1201 do include a very small amount of mass that may be considered as second tuning mass 1062. It will be further appreciated that solid-state actuator 1061 is 180.degree. out of phase as compared with active tuning element 415 of FIG. 6A.

Figure 22A:
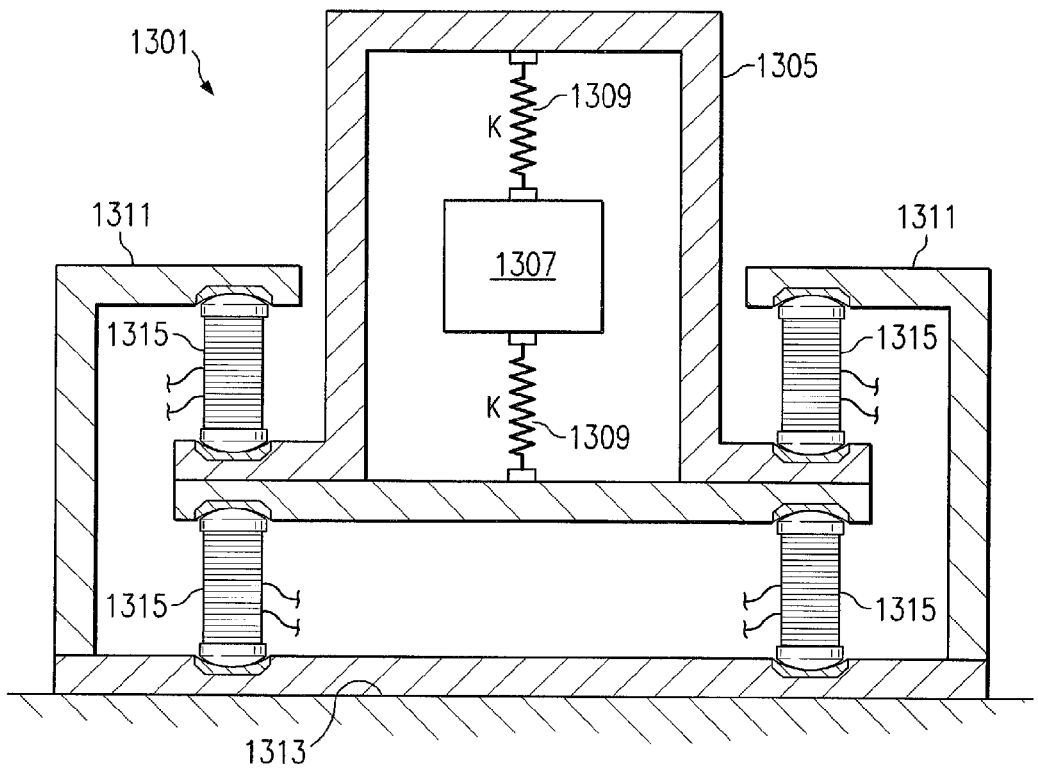
FIG. 22A is a simplified schematic of an alternate embodiment of the tunable vibration isolator according to the present invention shown in cross section.
Figure 22B:
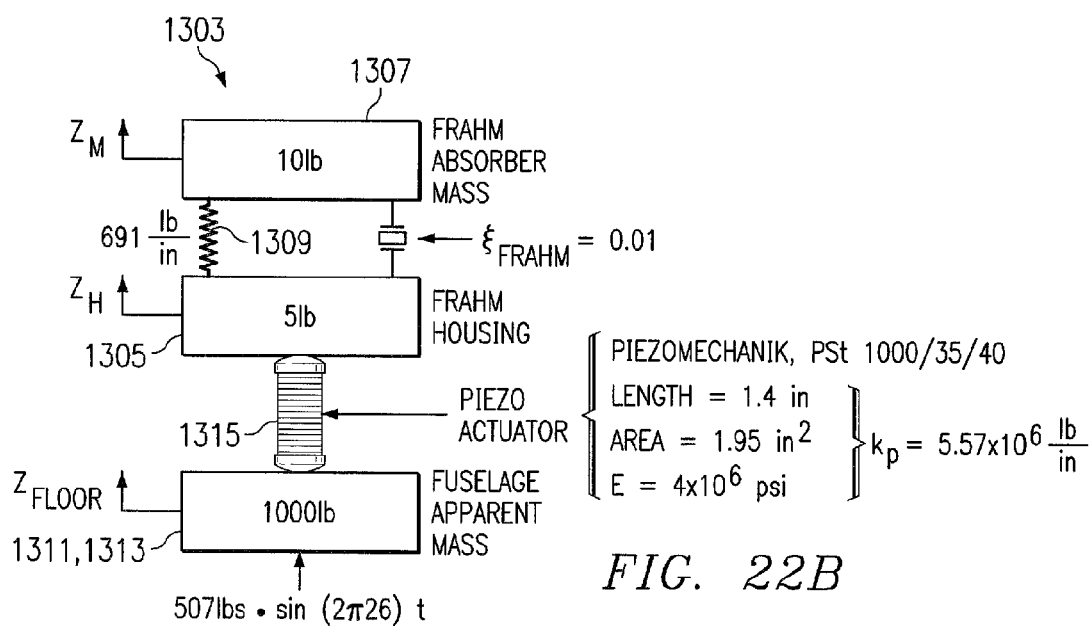
FIG. 22B is a mechanical equivalent model of the tunable vibration isolator of FIG. 22A.

Referring now to FIGS. 22A and 22B in the drawings, another embodiment of the tunable vibration isolator of the present invention is illustrated. In this embodiment, a vibration absorbing Frahm, or tuned mass absorber, is modified with active piezoceramic tuning elements. FIG. 22A shows a simplified schematic of an exemplary piezoelectric frahm 1301 in a cross-sectional view; and FIG. 22B shows a mechanical equivalent model 1303 for piezoelectric frahm 1301.

Piezoelectric Frahm 1301 includes a Frahm housing 1305 that houses a Frahm absorber mass 1307. Frahm absorber mass 1307 is suspended within Frahm housing 1305 by a spring member 1309. A mounting structure 1311 is rigidly coupled to a vibrating mass 1313, such as an aircraft fuselage. Frahm housing 1305 is coupled to mounting structure 1311 via a solid state actuator, preferably at least one piezoceramic actuator 1315.

With this configuration, piezoceramic actuators 1315 are in series with spring member 1309, thereby allowing the piezoceramic actuators 1315 to change the mobility of Frahm housing 1305. This results in a lighter Frahm, i.e., moving mass, being able to achieve the same level of vibration reduction as a much heavier Frahm. This is done by increasing the amplification factor, $Q=1/(2\xi)$, by decreasing the Frahm damping, $\xi$.

In addition, slight variations in the Frahm operating frequency can be achieved through active re-tuning with piezoceramic actuators 1315; however, it should be understood that such re-tuning may require a piezoactuator gain mechanism, depending upon the degree of frequency shift.

This embodiment of the present invention solves the problem of damping that reduces the effectiveness of the moving mass. In addition, this embodiment provides a means for making the Frahm less sensitive when installed on structures with different impedances.

Figure 23A:
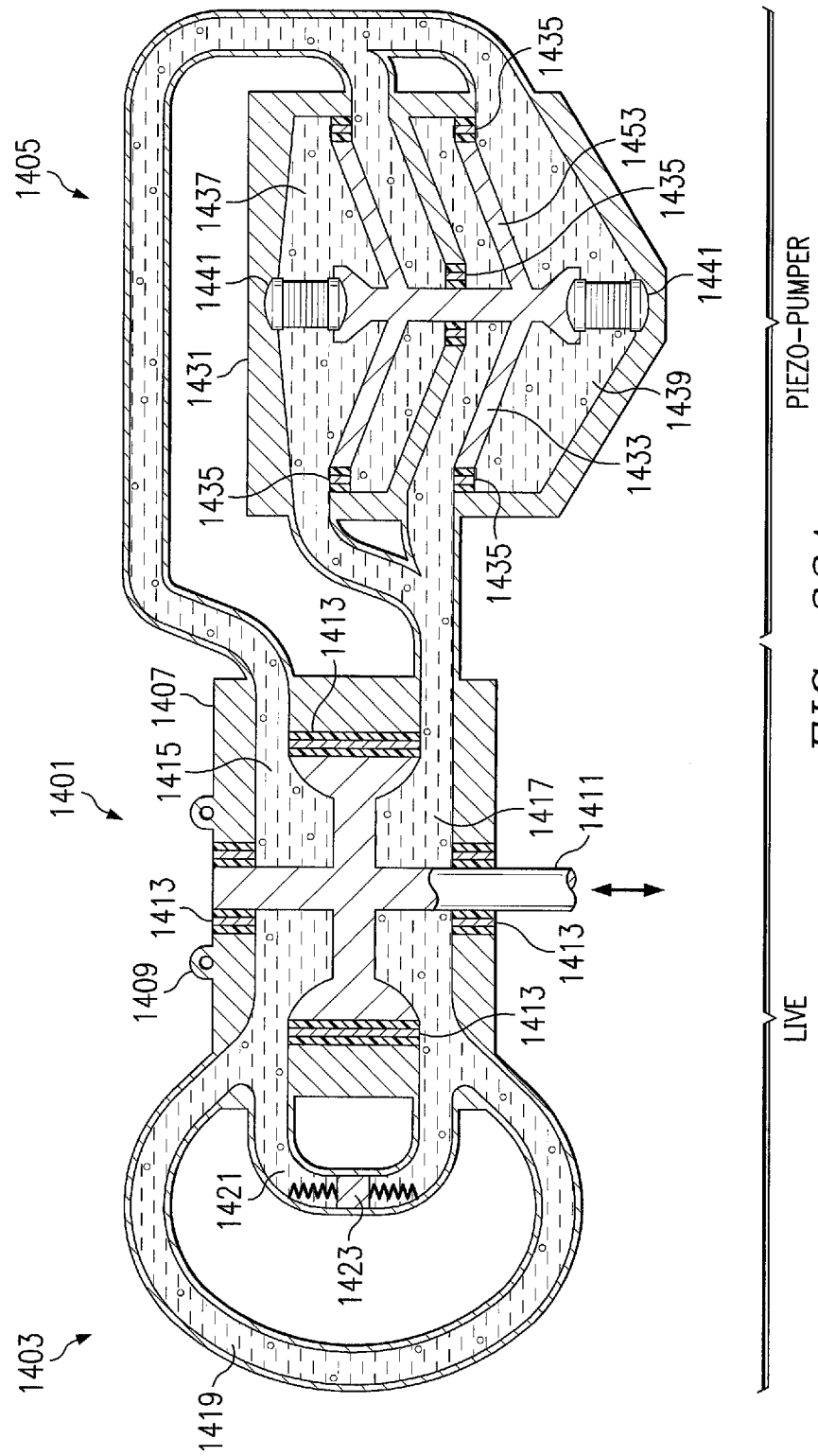
FIG. 23A is a simplified schematic of an alternate embodiment of the tunable vibration isolator according to the present invention shown in cross section.
Figure 23B:
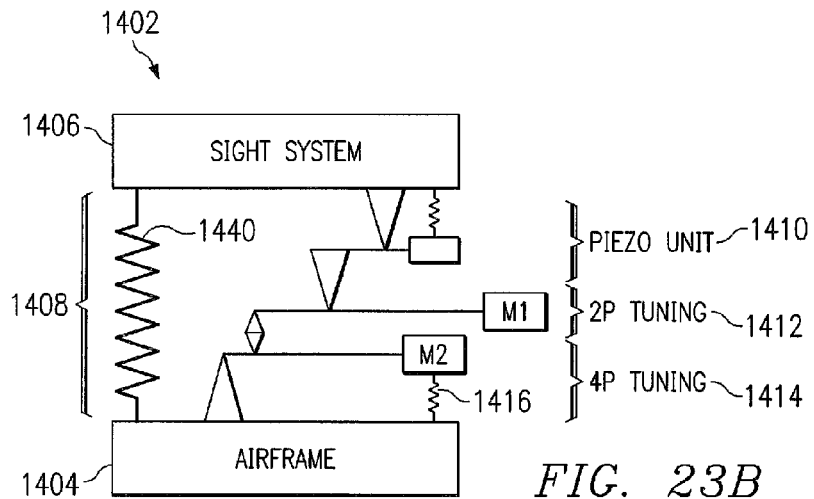
FIG. 23B is a mechanical equivalent model of the tunable vibration isolator of FIG. 23A.

Referring now to FIGS. 23A and 23B in the drawings, another embodiment of the present invention is illustrated. In this embodiment, two novel features have been combined into a single, modular LIVE unit 1401. LIVE unit 1401 includes a dual frequency LIVE portion 1403 and a multistage piezo-pumper portion 1405. FIG. 23A shows a simplified schematic of LIVE unit 1401 in a cross-sectional view; and FIG. 23B shows a mechanical equivalent model 1402 of LIVE unit 1401.

LIVE portion 1403 includes a housing 1407 having a mounting portion 1409 adapted for connection to a body for which it is desirable to isolate vibration, i.e., an isolated body. A piston 1411 is resiliently coupled to housing 1407 by elastomeric seals 1413. Housing 1407, piston 1411, and elastomeric seals 1413 define an upper fluid chamber 1415 and a lower fluid chamber 1417.

A primary tuning port 1419 is in fluid communication with both upper fluid chamber 1415 and lower fluid chamber 1417. Primary tuning port 1419 is configured to allow Isolation of harmonic vibration at a first selected frequency. A secondary tuning port 1421 is also in fluid communication with both upper fluid chamber 1415 and lower fluid chamber 1417. In the preferred embodiment, a spring-mass system 1423 is operably associated with secondary tuning port 1421. Spring-mass system 1423 creates a new degree of freedom. Secondary tuning port 1421 allows isolation of harmonic vibration at a second selected frequency. It will be appreciated that the mass of spring-mass system 1423 may be zero, allowing the fluid in secondary tuning port 1421 to function as the mass operating against the spring in spring-mass system 1423. It will be further appreciated that additional tuning ports may be added for applications in which it is desirable to isolate additional harmonic frequencies.

A multistage piezo-pumper portion 1405 includes a housing 1431 that houses a piston 1433. Piston 1433 is resiliently coupled to housing 1431 by elastomeric seals 1435. Housing 1431, piston 1433, and elastomeric seals 1435 define a first fluid chamber 1437 and a second fluid chamber 1439. First fluid chamber 1437 is in fluid communication with upper fluid chamber 1415, and second fluid chamber 1439 is in fluid communication with lower fluid chamber 1417. Piston 1433 is actuated by at least one piezoceramic actuator 1441.

In this manner, piezoceramic actuators 1441 actively augment the vibration attenuation capability of LIVE unit 1401 in both the first selected frequency range and the second selected frequency range. LIVE unit 1401 is capable of providing greater than 99% isolation in wide frequency ranges with extremely low power. Low power can be achieved because piezoceramic actuator 1441 operates at close to a 90 degree phase angle. It should be understood that the dual frequency piezoactuator feature and the multistage piezo-pumper may be utilized independently of each other in a vibration isolation system.

Mechanical equivalent model 1402 includes a vibrating mass 1404 and a isolated mass 1406 separated by a tunable LIVE unit 1408. It will be appreciated that the positions of vibrating mass 1404 and isolated mass 1406 may be reversed without affecting the operation of the system. In the example of FIG. 23B, vibrating mass 1404 is an airframe and isolated mass 1406 is a sight system.

Tunable LIVE unit 1408 comprises at least one spring 1440, at least one solid-state actuator 1410, a first tuning mass 1412, a second tuning mass 1414, and a second spring 1416. In this case, spring 1440 represents elastomeric seals 1413; first tuning mass 1412 represents primary tuning port 1419, second tuning mass 1414 and second spring 1416 represent spring-mass system 1423; and solid-state actuator 1410 represents piezoceramic actuators 1435 and 1441. It should be understood that mechanical equivalent model 1402 is representative of a wide variety of configurations and applications of tunable LIVE units.

Referring now to FIGS. 24-27 in the drawings, another embodiment of the tunable vibration isolation system according to the present invention is illustrated. This embodiment relates to an active vibration LIVE mount system 1501 that is particularly well suited for rotating machinery including diesel engines, gas turbine engines, generator sets, and gearboxes. The LIVE mount 1501 is lightweight, low cost, and has very low power requirements, i.e., virtually no heat loss. This embodiment will be described with reference to rotating machinery on a naval vessel or ship.

To maximize survivability and mission effectiveness, acoustic radiation from a ship must be carefully controlled. This requires treatment of both external noise sources such as the rotating propeller and hull slamming, and internal noise sources. Of primary concern for internal noise is precluding structural-borne vibration transmission from rotating machinery to the ship's hull structure, particularly in the frequency range of hull natural frequencies.

In the preferred embodiment, the ship's primary propulsion is provided by diesel engines and the electrical power is provided by diesel engine-generator sets, both of which have 12-piston, 4-stroke diesels with the same approximate maximum speed of 1,800 rpm. Therefore the vibration treatment system described can be directly applied to said diesel engine and said diesel-generator sets.

Figure 24:
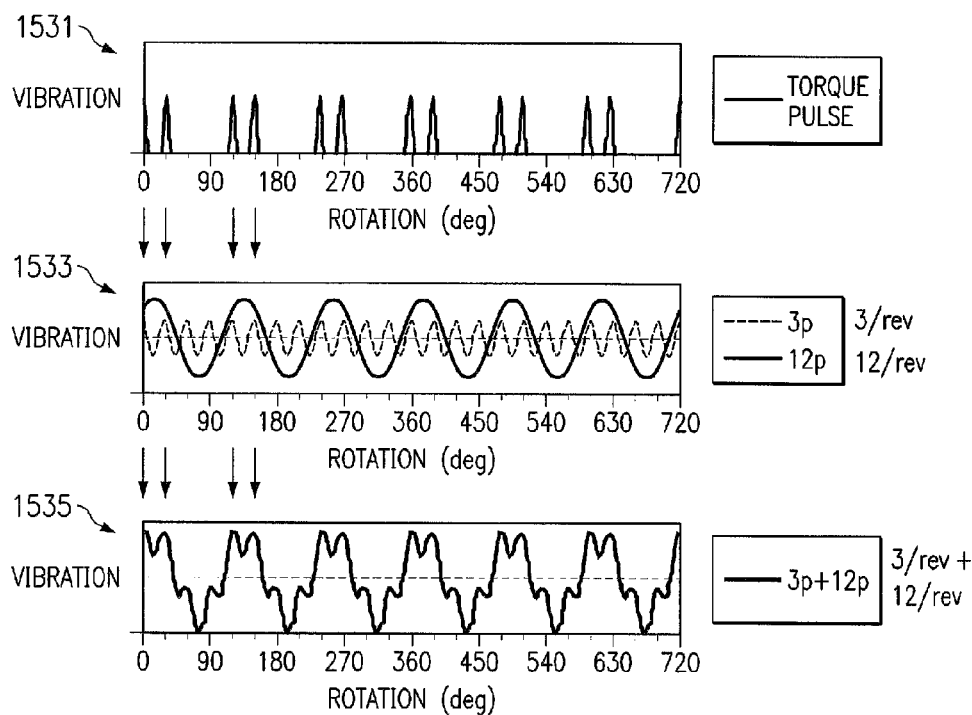
FIG. 24 is a set of charts of the vibrations of the diesel engines of a naval vessel or ship according to the present invention.

Referring now to FIG. 24 in the drawings, the vibration generated by said diesel engine will be described. The vibration generated by said diesel engine consists principally of 1/rev, 3/rev, and 12/rev, that is, 1 cycle of vibration per revolution, 3 cycles of vibration per revolution, and 12 cycles of vibration per revolution. As shown in graphs 1531, 1533, and 1535, the torque pulses are spaced 30°, 90°, 30°, 90°, etc. A simple Fourier series can be used to illustrate the harmonic components of cos 3ωt and cos 12ωt. In addition, the 1/rev term (not shown in FIG. 28) will be present due to any mass imbalance.

Point-of-source vibration attenuation is the most effective means of structure-borne vibration treatment, especially when localized "choke" points exist within the design. The traditional approach has been to use soft elastomeric mounts that place the engine's mounted natural frequency low, i.e., less than 70% of the excitation frequency. This provides attenuation in the range of 40%, i.e., transmissibility of 60%, or −8 dB. The stiffness must be appropriate to support the engine weight and torque.

The mounted roll, i.e., about the torque-axis, natural frequency of the diesel engine in the preferred embodiment with the prior art is 3.9 Hz, which provides a natural attenuation of 82% (−15 dB) of 1/rev at engine idle (600 rpm). Neglecting the structural compliance of ship, the mounted vertical natural frequency of the diesel engine with prior art is 7.1 Hz, which provides a natural attenuation of only 4% (−0.4 dB).

Figure 25A:
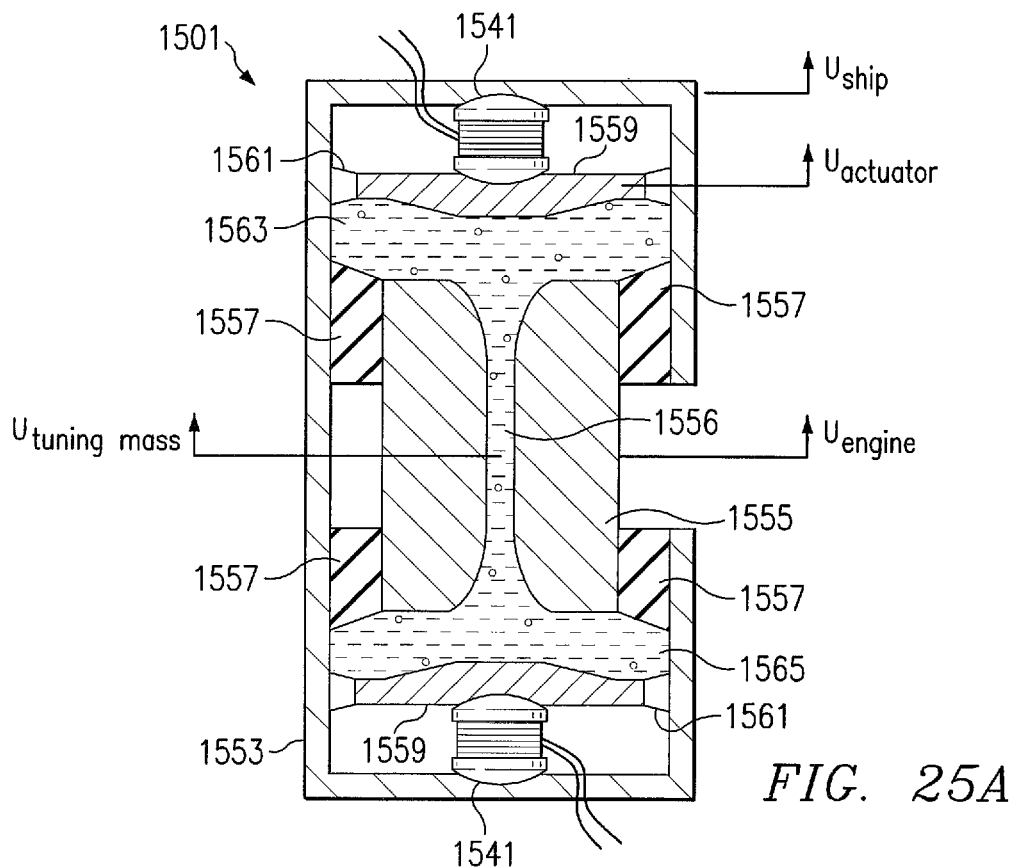
FIG. 25A is a simplified schematic of the LIVE mount used on the naval vessel or ship.

According to the present invention, LIVE mount 1501 is used in place of the soft mounts and augmented to cancel harmonic vibrations with extremely low power requirements through the use of embedded piezoceramic actuators 1541 (see FIG. 25A). In addition to exceptional passive treatment, by utilizing piezoceramic actuators 1541, LIVE mount 1501 provides active means of canceling vibration, resulting in broadband attenuation of 99.6% isolation (−48 dB). Piezoceramic actuators 1541 attenuate transmissibility between the vibrating body and isolated body.

Figure 25B:
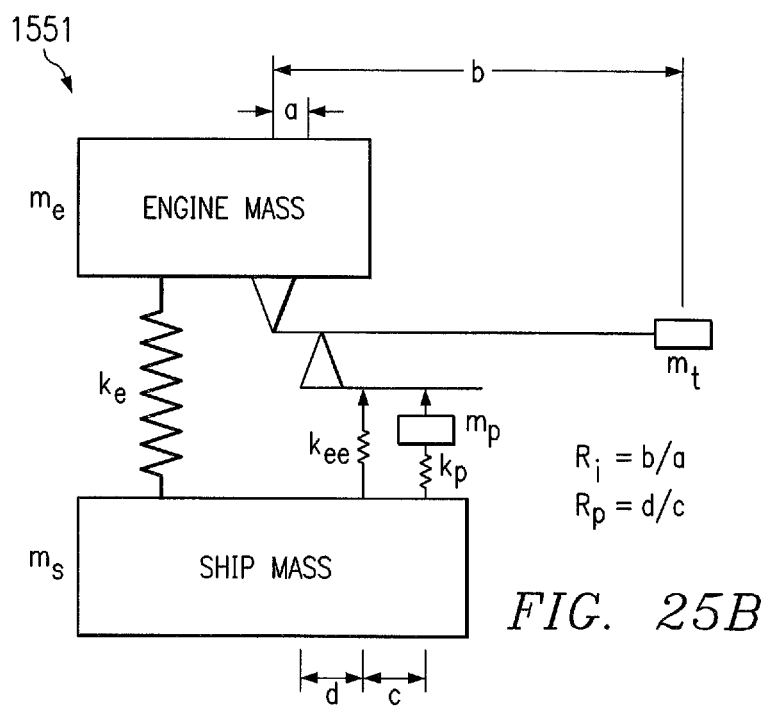
FIG. 25B is a mechanical equivalent model for the LIVE mount of FIG. 25A.

Referring now to FIGS. 25A and 25B in the drawings, the operation of LIVE mount 1501 will be described. FIG. 25A shows a simplified schematic of LIVE mount 1501 in a cross-sectional view; and FIG. 25B shows a mechanical equivalent model 1551 for LIVE mount 1501. LIVE mount 1501 includes a housing 1553. A piston 1555 is resiliently coupled to housing 1553 by elastomeric seals 1557. Piston 1555 includes an axial tuning port 1556. The diesel engine is rigidly coupled to piston 1555, and housing 1553 is rigidly coupled to said ship.

At least one piezoceramic actuator 1541 is operably associated with housing 1553. In FIG. 30A, piezoceramic actuators 1541 are coupled to rigid diaphragms 1559. Diaphragms 1559 are resiliently sealed to housing 1553 by seals 1561. Housing 1553, piston 1555, elastomeric seals 1557, diaphragms 1559, and seals 1561 define an upper fluid chamber 1563 and a lower fluid chamber 1565. Upper fluid chamber 1563 and lower fluid chamber 1565 are in fluid communication through tuning port 1556. Upper fluid chamber 1563, lower fluid chamber 1565, and tuning port 1556 are completely filled with an inviscid, dense fluid and pressurized to prevent cavitation. The product of the fluid volume and the fluid density defines the tuning mass, $m_t$.

As is shown on mechanical equivalent model 1551, the area ratio, $R_1$, of housing 1553 to tuning port 1556 is analogous to the length ratio of the arms, b/a; the elastomeric spring 1557 is analogous to the mechanical spring, $k_e$; and the inertial effect of tuning port 1556 is analogous to the inertial effect of the tuning mass $m_t$ on the mechanical arm.

As piston 1555 moves up or down, it forces fluid to move in the opposite direction, producing an inertial force that cancels the elastomeric spring force at a discrete frequency, known as the passive isolation frequency or antiresonance, defined below.

$$f_{iso} = \frac{1}{2\pi}\sqrt{\frac{k_e k_p}{k_e(m_p + R_1^2 m_t) + k_p m_t R_1(R_1 - 1)}} \quad \text{Equation (1)}$$

The piezoceramic actuator stiffness and mass is represented by $k_p$ and $m_p$, respectively. For simplicity, Equation (1) assumes the combined stiffness, $k_{ee}$, of the fluid, i.e., bulk modulus, and the containment vessel is infinite, and Rp=1, i.e., d=c.

Several features of the LIVE mount 1501 make it an efficient application of piezoceramic actuators. First, the piezoceramic material is not in the primary steady-load path, and thus, does not need to be sized for critical static load conditions. Second, the fluid is utilized both as inertia to create an antiresonance, as well as, for hydraulically amplifying the actuator stroke. Finally, because piezoceramic actuators 1541 are only required to augment the passive performance, their size and attendant cost remain small, even for large applications like marine propulsion systems.

Piezoceramic actuators 1541 are preferably commanded using a Multi-Point Adaptive Vibration Suppression System (MAVSS) algorithm to augment the antiresonance characteristics of LIVE mount 1501, resulting in dramatic reduction in vibration transmissibility into the structure of ship 1503. The MAVSS control algorithm, is an inherently stable, yet robust time domain control methodology that uses traditional Higher Harmonic Control (HHC) techniques of identifying the Fourier components of the disturbance at the frequencies of interest, and generating the control command necessary to cancel these disturbances by inverting the plant dynamics at each particular frequency. The MAVSS is programmed to cancel multiple harmonics, for example, both the 1/rev vibration and 3/rev vibration simultaneously. In addition to the system identification aspects of the MAVSS algorithm, an additional feature is the use of an objective function that includes both disturbance and control effort to govern the feedback control process.

The MAVSS control gain matrix is calculated based on the identified response from the control actuators to the performance sensors, T. In practice, the sine and cosine components of this response are identified using a finite-difference approach. With this transfer function matrix identified, the MAVSS control gain is calculated as:

$$K = [T^T R_s T + Q]^{-1} T^T R_s \quad (1)$$

where Q is a matrix penalizing the input to each actuator, i.e., control penalty, and $R_s$ is a matrix penalizing the response of each sensor, i.e., performance weighting. The control penalty is reduced to a scalar value by setting Q=ρl, where l is the identity matrix. This produces an equal control penalty for each actuator. Likewise, setting $R_s$=l produces an equal performance weight for each sensor. The MAVSS control input can be calculated as:

$$u_{new} = \alpha \cdot K \cdot Z + u_{old} \quad (2)$$

where $u_{new}$ is the control input for the next integer number of rotor revolutions, Z is the response at the performance sensors, and $u_{old}$ is the previous control input. As the control penalty is relaxed (cheap control asymptote), K becomes $T^{-1}$, and the control input produces a response at the sensors equal and opposite to the hub disturbances, resulting in zero response by superposition.

For this system, each LIVE mount 1501 preferably has one vertical accelerometer mounted on the vibrating body-side of LIVE mount 1501. The MAVSS system remains stable and continues to operate in the event of a failure of one or more sensors. In the preferred embodiment for use on marine propulsion systems, the MAVSS senses engine rpm and automatically tracks the harmonic vibration as the engine's speed changes.

Figure 26A:
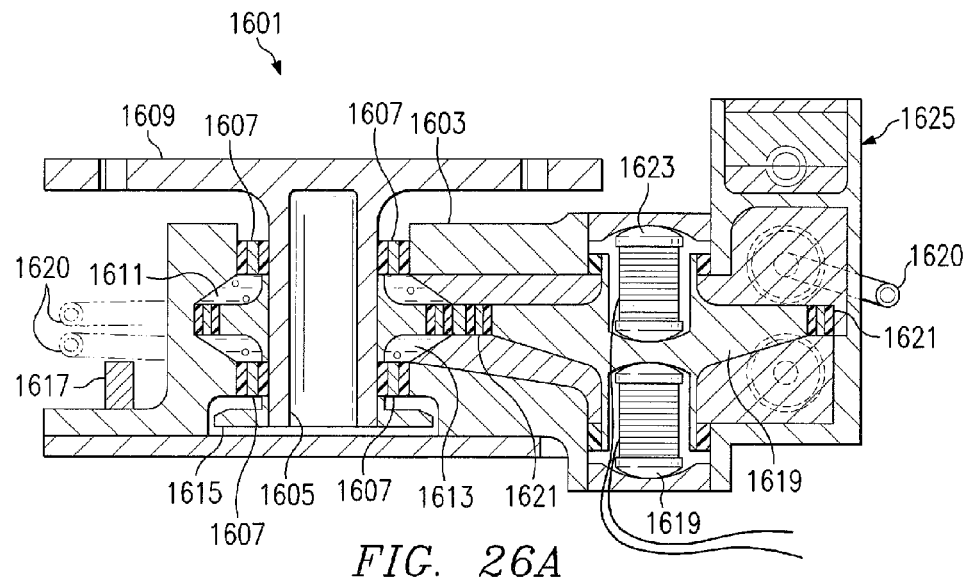
FIGS. 26A-26C are cross-sectional and perspective views of an exemplary mechanical design for the LIVE mount of FIG. 25A.
Figure 26B:
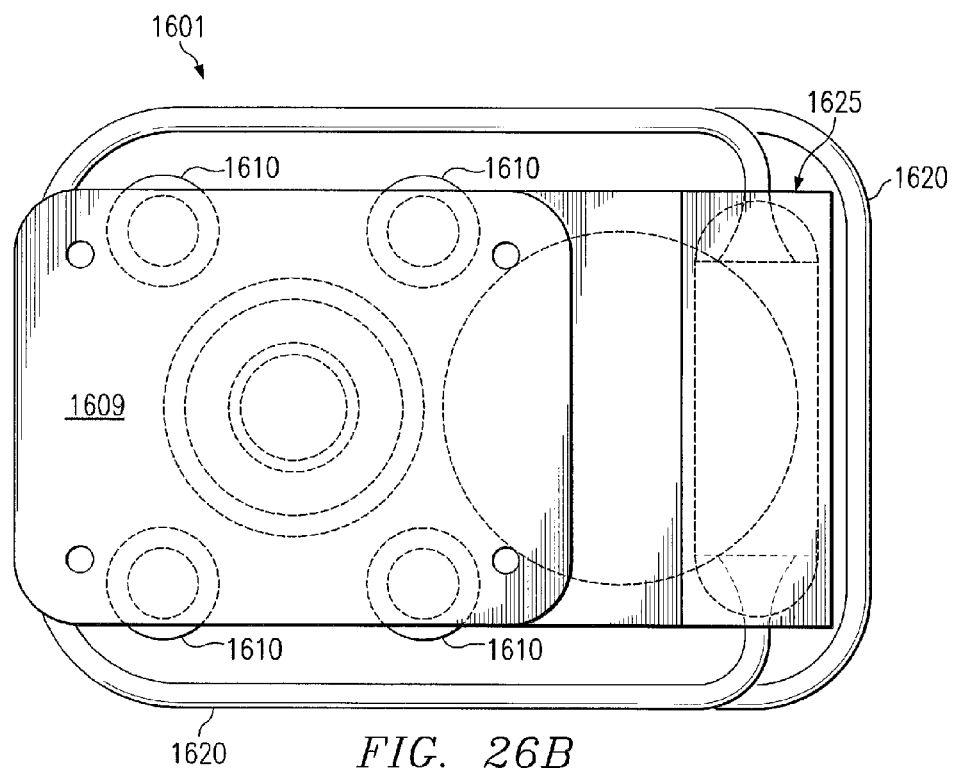
Figure 26C:
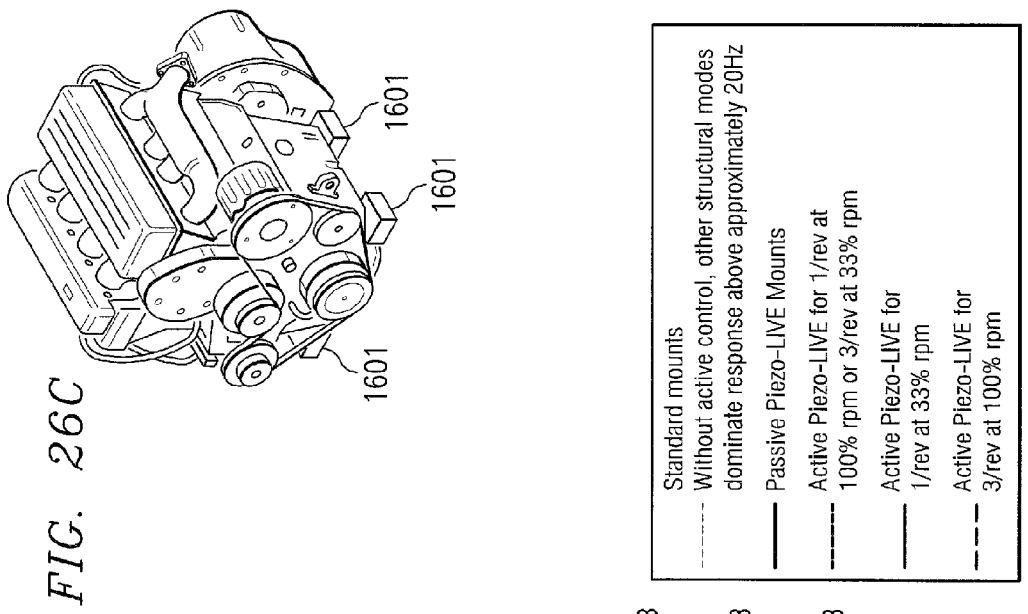

Referring now to FIGS. 26A-26C in the drawings, an exemplary mechanical design for the LIVE mount of FIG. 25A is illustrated. A LIVE mount 1601 includes a housing 1603 for housing a piston 1605. Piston 1605 is resiliently carried within housing 1603 by elastomeric seals 1607. A mount plate 1609 configured for attachment to a diesel engine is connected to piston 1605. In the preferred embodiment, four mechanical springs 1601 disposed between mount plate 1609 and housing 1603 are used to prevent the static creep inherent in elastomerics. Housing 1603, piston 1605, and elastomeric seals 1607 define an upper fluid chamber 1611 and a lower fluid chamber 1613. It is preferred that housing 1603 be made from aluminum.

Elastomeric seals 1607 preferably provide vertical stiffness of 23,000 lb/in and transverse stiffness of 30,000 lb/in. An optional skirt (not shown) may be added around mount plate 1609 to protect the elastomeric elements from oil contamination. An up and down overtravel stop 1615 is operably associated with piston 1605 to prevent excessive loading to the elastomerics. It is preferred that overtravel stop 1615 be positioned such that contact does not occur under normal operation. In the preferred embodiment, an accelerometer 1617 is located on the base of housing 1603 as the feedback sensor in the above.

Housing 1603 also houses a piezo-piston 1619. Piezo-piston 1619 is resiliently carried within housing 1603 by elastomeric seals 1621. Housing 1603, piezo-piston 1619, and elastomeric seals 1621 further define upper fluid chamber 1611 and lower fluid chamber 1613. Upper fluid chamber 1611 and lower fluid chamber 1613 are in fluid communication via an elongated tuning port 1620 that preferably coils around housing 1603.

Piezo-piston 1619 is driven by a stack of at least two piezoceramic actuators 1623. Piezoceramic actuators 1623 are preferably stacked in a push-pull fashion for reliability. If one piezoceramic actuator 1623 fails, the stack will continue to operate with the remaining healthy piezoceramic actuator 1623. This push-pull arrangement provides an energy efficient design, as is discussed in more detail below. Piezoceramic actuators 1623 are positioned on opposing sides of piezo-piston 1619 having a piezo area ratio, $R_p$.

LIVE mount 1601 provides an effective piston diameter with a tuning port inner diameter. This provides a LIVE area ratio, $R_l$. The tuning port 1620 is coiled around housing 1603 to provide the appropriate fluid tuning mass, $m_f$, to provide optimum passive isolation frequency per Equation (1). Though not shown, it is preferred that tuning port 1620 be encased within a protective structure, such as a casting. An air-to-fluid accumulator 1625 with sight glass allows thermal expansion of the fluid while maintaining the appropriate pressure to preclude cavitation during operation.

Figure 27:
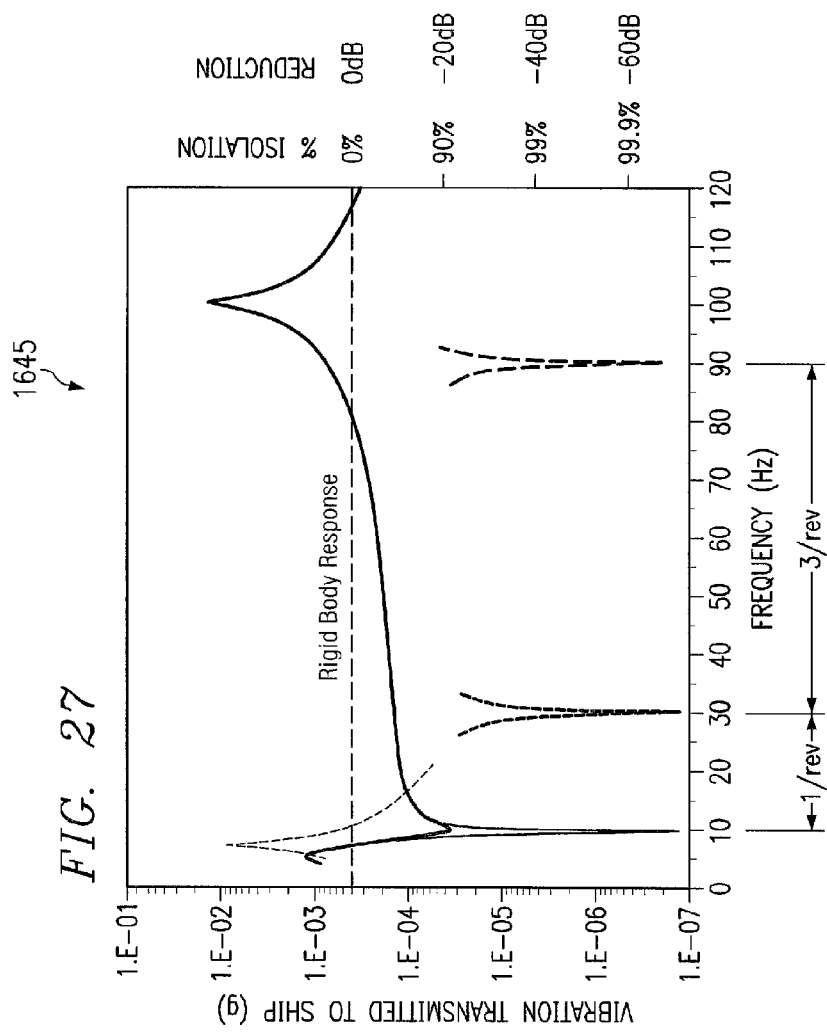
FIG. 27 is a chart depicting the vibration attenuation of the LIVE mount of FIGS. 26A-26C.

Referring now to FIG. 27 in the drawings, a chart 1645 depicting the vibration attenuation of LIVE mount 1601 is illustrated. LIVE mount 1601 is expected to reduce the structure-borne mechanical noise signature below 100 Hz by more than 99% relative to rigid body response (40 dB). Analytical simulations actually show 99.9% reduction (−60 dB). As is shown, LIVE mount 1601 is capable of 99.9% vibration attenuation (−60 dB) at both 1/rev and 3/rev. However, in practical application this level of reduction is probably below the ambient noise level.

Using a switching amplifier power supply, energy is swapped between the amplifier and capacitive load with low losses. This approach can result in an energy savings on the order of 75%. Additionally, because LIVE mount 1601 utilizes piezoceramic actuator pairs being simultaneously driven out of phase, i.e., push-pull, energy recovery during each cycle is provided.

It is apparent that an invention with significant advantages has been described and illustrated. Although the present invention is shown in a limited number of forms, it is not limited to just these forms, but is amenable to various changes and modifications without departing from the spirit thereof.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A vibration isolator comprising:
   a housing;
   a piston resiliently disposed within the housing;
   a first fluid chamber and a second fluid chamber defined by the housing and the piston;
   a tuning passage placing the first fluid chamber and the second fluid chamber in continuous fluid communication;
   a tuning mass disposed within the tuning passage;
   a tuner having:
      a fluid exit port on a first end; and
      an elongated tubular shaft on a second end;
      the tuner configured to telescope the elongated tubular shaft within the tuning passage to adjust a frequency of the tuning mass, wherein movement of the tuner changes an axial length of the tuning passage; and
   a first actuator and a second actuator both rigidly coupled to a vibrating structure and resiliently coupled to the housing for selectively transferring forces to the housing;
   wherein the first and second actuators are axially aligned and operate out of phase to each other.

2. The vibration isolator according to claim 1, wherein the tuning mass is a fluid.

3. The vibration isolator according to claim 1, further comprising:
   at least one flow diverter aligned with the tuning passage for directing the flow of a tuning fluid;
   wherein the turning mass is the tuning fluid.

4. The vibration isolator according to claim 1, wherein the actuators are piezoceramic actuators.

5. The vibration isolator according to claim 1, wherein the actuators are electromagnetic actuators.

6. The vibration isolator according to claim 1, wherein the actuators are pneumatic actuators.

7. The vibration isolator according to claim 1, wherein the actuators are hydraulic actuators.

8. The vibration isolator according to claim 1, wherein the actuators are piezoelectric actuators.

9. The vibration isolator according to claim 1, wherein the axial length of the tuning passage is selectively adjusted.

10. The vibration isolator according to claim 1, further comprising:
a pump in communication with the tuner and configured to translate the tuner between an extended and a retracted position.

11. The vibration isolator according to claim 1, further comprising:
a gas accumulation chamber in fluid communication with the first fluid chamber for collecting and accumulating gas from the first fluid chamber, the second fluid chamber, and the tuning passage.

12. The vibration isolator according to claim 11, wherein the gas accumulation chamber permits steady state pressure relief within the housing while avoiding oscillatory pressure.

* * * * *